Feb. 16, 1965 H. A. GIROUD ETAL 3,170,042

CONFERENCE ARRANGEMENTS

Filed Dec. 14, 1962 8 Sheets-Sheet 1

INVENTORS H. A. GIROUD
B. MC KIM

BY

SE Hollander

ATTORNEY

CONFERENCE ARRANGEMENTS

Filed Dec. 14, 1962 8 Sheets-Sheet 3

Feb. 16, 1965 H. A. GIROUD ET AL 3,170,042

CONFERENCE ARRANGEMENTS

Filed Dec. 14, 1962 8 Sheets-Sheet 6

3,170,042
Patented Feb. 16, 1965

3,170,042

CONFERENCE ARRANGEMENTS

Henry A. Giroud, New York, N.Y., and Burton McKim, Morris Township, Morris County, N.J., assignors to Bell Telephone Laboratories, Incorporated, New York, N.Y., a corporation of New York Filed Dec. 14, 1962, Ser. No. 244,746
16 Claims. (Cl. 179—27)

This invention relates to conference arrangements and particularly to improvements for controlling such conference arrangements.

In a very particular aspect this invention relates to improvements for remotely controlling and supervising connections to "meet me" type conference circuits and also improvements for interconnecting a plurality of such circuits to form large capacity conference circuits.

Meet me conference arrangements are generally distinguished from other types of conference arrangements in that, at a pre-arranged time, each conferee is required to perform an operation to connect himself to a common transmission circuit thereby rendezvousing or meeting with the other conferees. In contrast to meet me conference circuits, arrangements sometimes referred to as "conference call" or "group call" circuits are known whereby a control station performs an operation to summon all of the conferees in a preselected group to a conference. Some of the known group call arrangements have limitations and are somewhat inflexible due to the fact that the conferees must be assigned in pre-arranged groups making it difficult to hold a conference with only part of a group or with one group including individual conferees from other groups.

Meet me arrangements, however, are inherently more flexible in this respect since there are, generally, no so-called "groups" of conferees. Instead, any conferee may be included on the conference call if he performs the prescribed operations to meet the other conferees on the common conference circuit at the time designated for the conference.

In the area of telephone switching meet me conference service is often furnished by assigning a multibranch transmission bridge to a special "conference code." Customers, desiring to hold a conference, dial this "conference code" at a pre-arranged time causing the switching equipment to connect each of their telephones to one branch of the common transmission bridge.

More specifically with reference to step-by-step telephone systems, a multibranch transmission bridge is provided and has its branches or legs connected to successive terminals on the switch bank multiple associated with a group of switches. Each bank terminal corresponds to a particular telephone number or code; however, the customers need only dial the number assigned to the first terminal in order to gain access to the conference circuit. At the time designated for the conference, all the conferees dial the number which has been assigned as the "conference code." The first customer to dial the conference code causes a switch, in the bank having access to the conference number, to select the first terminal and connect thereto making that terminal busy. Successive calls originated by the other conferees, in trying to establish connection to the first terminal, will hunt over this busy terminal and select the next consecutive idle terminal until each conferee has been connected to a terminal.

It can readily be seen that with this type conference arrangement all customers having knowledge of the "conference code" can gain access to the conference circuit. Certain problems arise under these circumstances, since customers may inadvertently or maliciously dial the conference code and intrude on priorly established conferences. Furthermore, some customers may abuse the privilege of using the conference circuit by repeatedly holding the circuit busy for prolonged periods thereby denying conference service to customers that may be in more urgent need of the conference facilities.

Some prior art circuits suggest ways of circumventing these problems by denying access to the conference circuit to all customers except a few, so-called, "privileged" customers. Service restriction of this sort can be accomplished in many ways. For instance, a conference circuit may be assigned to a restricted level on a switch. Only those customers having access to the restricted level can gain access to the conference circuit while all other "nonprivileged" customers are denied access.

Another way of restricting access to a meet me conference circuit is to make all of the branches or legs of the conference circuit busy to regular customers while permitting only customers having special equipment to override the busy leg. This feature is sometimes known as the executive right-of-way feature when it is used in PBX systems for overriding a busy extension line.

It can readily be seen that these arrangements restricting the access to a conference circuit are somewhat undesirable since customers must be provided with special arrangements for overriding the busy circuit or the customers must be assigned to certain line equipments having an unrestricted class of service for providing access to the conference circuit. Furthermore, these arrangements do not prevent unauthorized intrusion on the conference call since any nonrestricted customer having knowledge of the "conference code" can dial the code and gain access to the circuit even though a priorly established conference call is in progress.

Certain other conference arrangements are known wherein the customer originating a conference call can make available only that number of branches needed for his particular conference. These arrangements prevent unauthorized or malicious intrusion on established conference calls, but do not solve the problem of prolonged use and abuse of the conference facilities by certain customers since any customer having knowledge of the "conference code" can unbusy the circuit at will and maintain the conference circuit busy denying other customers use of the circuit for extensive periods.

It is therefore one object of this invention to increase the flexibility of conference arrangements and to improve the control and supervisory facilities of conference arrangements wherein unwanted intrusion and misuse of the circuit is minimized.

The meet me conference arrangements discussed above have a capacity to serve a maximum number of conferees generally limited by the number of branches or legs associated with the transmission bridge. The size of a conference circuit to be used in a telephone network may, of course, be governed by voice transmission considerations or in some instances by the traffic to be handled by the circuit, i.e., the average number of conferees anticipated for the majority of conference calls. Using this latter consideration in the design of conference facilities minimizes the amount of equipment needed for a given traffic situation and utilizes that equipment which is provided to the utmost degree.

Under unusual circumstances, however, it may be necessary to have large capacity conference accommodations available. If this situation does not occur too frequently it may be more economical to provide arrangements for combining smaller circuits to make a larger capacity circuit than to provide both small and large capacity circuits separately.

Of course, if a multibranch transmission bridge had each of its branches terminated at a switchboard position, the switchboard attendant could control the access to the circuit, prevent customers from maintaining the circuit busy for prolonged periods, and through the use of her cord circuits, "bridge" or connect a plurality of individual circuits together to form a larger capacity conference circuit.

In large switching networks, however, it is desirable to centrally locate the conference circuits with respect to the conferees using the circuit. This assures that each conferee can be connected to a leg of the conference bridge over the shortest possible route thereby realizing savings in transmission facilities such as cable pairs, radio lines, carrier links and many other types of facilities used for connecting the conferee to the conference circuit. If a manual conference circuit (i.e., a conference circuit having its legs terminated at a switchboard position and under control of an attendant thereat) is used and this switchboard position is located at one of the extremities of the network, it can readily be seen that some conferees must necessarily be connected to the circuit over longer routes than would ordinarily be required had the conference circuit been more centrally located with respect to the conferees.

Although certain savings may be realized through the "bridging" together of smaller circuits to accommodate large conferences, such as might be done at the attendant's switchboard with the attendant's cord circuit, these savings may be offset by the losses encountered through the longer routing of customers to the conference circuit terminated in the switchboard at one of the extremities at the network.

It is therefore another object of this invention to provide flexible conference arrangements that can be controlled and supervised from a remote point independently of the conference legs.

A more specific object of this invention is to improve the signaling arrangements used for controlling and supervising a conference arrangement from a remote location.

In accordance with one illustrative embodiment of our invention in a multioffice telephone switching network, a plurality of conference circuits are provided at a toll switching office conveniently located near the center of the network, for example, at Washington, D.C. Connected to the toll office are many satellite or local switching offices. These local offices are dispersed throughout the network and each serves its own particular city or community, examples of which may be Dallas, Miami, New York, etc. Telephone calls within a given community such as Dallas are handled by the local office serving that community, while calls between communities, such as Dallas and Miami, are generally routed over toll trunks that switch-through the centrally located toll office at Washington, D.C.

Remotely located with respect to the toll office conference circuits, but nevertheless, connected thereto over a signaling channel is an attendant operator switchboard. The exact location of this switchboard is not important to the invention, and the switchboard may be located in Baltimore which is near the toll office or it can be located with one of the satellite offices such as Miami, New York, Dallas, etc. For practical reasons, however, the switchboard is generally centrally located with respect to the communities which it serves.

In this illustrative example, the Baltimore attendant operator renders customer assistance in completing toll calls that switch-through the toll center and also on special service calls that require an operator, but moreover, the attendant aids in establishing conference calls between customers throughout the entire network.

Each of the aforementioned conference circuits, located at the Washington, D.C. toll office, comprises a multiterminal transmission bridge having a conference leg or channel connected to each of its terminals. All the legs connected to the same transmission bridge are assigned to a special "conference code" which the conferees must dial to gain access to the conference circuit, and each conference leg is normally made busy by a conference control circuit when the conference circuit is not in use. This control circuit is inaccessible to the customers and maintains the legs busy to prevent unauthorized or inadvertent use of the conference circuit by the network customers. The legs, however, can be selectively released for service by actuation of the conference control circuit under the control of the remotely located attendant switchboard in Baltimore when a network conference call is to be established. The attendant, therefore, is responsible for the administration of the conference facilities, and if necessary, the attendant can give preferential treatment to certain priority conference calls that may arise during times of national emergency or disaster. For instance, the attendant may request that certain customers desiring a conference delay their call until the more essential conference calls are disposed of, or by releasing a trunk for her own selection, the attendant can intrude on a conference call and request that the parties conclude their conference as soon as possible so that the conference facilities can be made available for an emergency conference call.

When a customer in one of the communities desires to originate a conference call, he calls the attendant using one of the regular attendant trunks available to him for that purpose and requests that conference facilities be provided at a prescribed time for a certain number of conferees. The Baltimore attendant then informs the conference originator of the proper "conference code" to dial. At this time the conference originator can undertake to inform the other conferees himself, or request that the attendant inform them of the exact time that the conference is to be held and the proper "conference code" to dial.

At the time prescribed for the conference, the Baltimore attendant transmits signals over the signaling channel to the conference control circuit at Washington, D.C. to remove the busy condition from a sufficient number of conference legs to provide one leg or conference channel for each of the conferees including the conference originator. As each leg is released for conference service, a "flashing" supervisory signal associated with that leg is returned over the signaling channel to the attendant switchboard. These signals, indicating that particular conference legs have been released for conference service, continue to "flash" until one of the conferees, after having dialed the "conference code," selects a leg and is connected thereover to the common transmission bridge. The supervisory signal associated with that leg then becomes a "steady" signal, and remains so until the conferee disconnects from that leg to extinguish the steady signal.

Now, had the conference originator requested facilities for a conference call that exceeded the terminal capacity of one conference circuit, the attendant at Baltimore has facilities inaccessible to the network customers which permit her to join or connect together in a special manner, a plurality of individual conference circuits to form a large capacity conference circuit at Washington, D.C. Since each of the individual conference circuits can be used separately, they are each assigned different "conference codes," and when a large conference is to be established, some of the conferees are requested to dial the code associated with one conference circuit, while the remaining conferees must dial a different code associated with one of the other conference circuits to be connected thereto. At the appropriate conference time, as with a separately used conference circuit, the attendant releases a sufficient number of legs for the conferences; however, the legs must be released in each conference circuit according to the number of conferees that were told to dial the code associated with that circuit. In addition, the attendant transmits a special signal over the signaling channel for each of the two individual conference circuits to be connected together..

Whereas the prior signals sent by the attendant caused individual conference legs to be released for selection by the conferees, this special signal now actuates the conference control circuit to maintain one specially arranged leg busy in each of the two conference circuits to be connected together. These specially arranged legs are held busy to prevent their selection by conferees while the terminals on their respective transmission bridges are connected together. The connection of two bridges together, telephonically interconnects the conferees that are connected to the remaining conference channels of the individual bridges thereby establishing a larger capacity conference circuit without adversely affecting transmission between the conferees.

The signaling channel between the remote attendant switchboard at Baltimore and the conference circuits at Washington, D.C. is arranged in a particular manner to provide the attendant with reliable control and supervisory facilities. For instance, the attendant will be alerted if the signaling channel should become disabled whether the conference circuits are idle or in use. If the signaling channel becomes disabled when the conference circuits are in use separately, or in use by being "bridged", e.g., being connected together, the conference call already in progress will not be disturbed. On the other hand, should the signaling channel become disabled when the conference circuits are idle, the conference trunks would be maintained "busy" until the trouble is corrected.

A feature of the invention resides in a meet me conference arrangement having means inaccessible to the customers for controlling and supervising connections to a conference circuit from a remote point.

Another feature of the invention is found in the means for controlling a plurality of individual conference circuits to permit these circuits to be used separately for small conferences or be used jointly for large conferences.

A further feature of the invention is found in the means for controlling a conference leg for dual purposes namely, to be used by conferees or to be used to "bridge" two separate conference circuits together.

A more specific feature of our invention resides in a meet me conference arrangement having each of its branches connected to a conference leg wherein a signal responsive control circuit is provided for each leg to control the customer access thereto, and wherein signals are sent from the remote switchboard location to render the legs available to customers desiring a conference or to combine a plurality of conference circuits by connecting certain of their legs together.

These and other objects and features will become apparent from the following description with respect to the drawing in which.

GENERAL DESCRIPTION

The arrangement and operation of the various components in the illustrative embodiment of the invention will be described subsequently with reference to detailed FIGS. 2 through 8. However, in order to first gain a general understanding of the arrangement contemplated, a brief general description will first be given with reference to the block diagram of FIG. 1.

*Arrangement of components*

Figure 1:
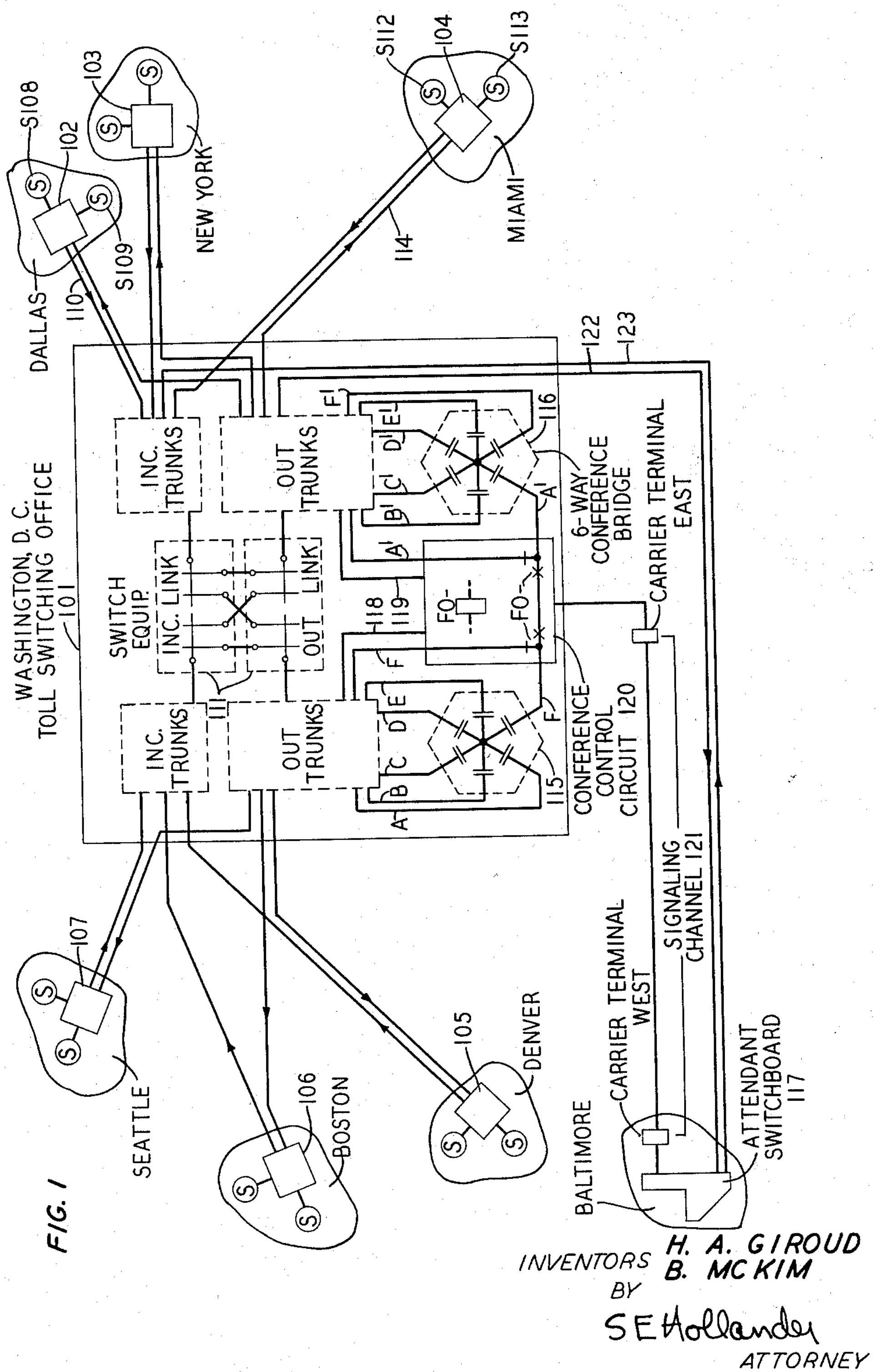
FIG. 1 represents a block diagram of the invention as employed in a telephone network.

Referring, therefore, to FIG. 1 there is shown a typical telephone network having a toll switching office 101 located at Washington, D.C. and serving many satellite or local switching offices represented by rectangles 102–107 in the communities designated Dallas, New York, Miami, Seattle, Boston and Denver.

Of course, it will be realized that the names given to these various localities have been assumed only for the purpose of illustration and are not in any way intended to depict an actual network and its communities.

Each of the satellite switching offices 102–107 serves many telephone customers of which only two have been shown in each community, and these customers are represented by the circles designated "S." Customers within the same community such as Dallas customers S108 and S109 can communicate with each other over local trunk and switching facilities at switching office 102 in the Dallas area. Furthermore, each of the local or satellite switching offices is connected to the toll switching office 101 via toll trunks, such as trunks 110 and 114 which interconnect the Dallas and Miami community switching offices 102 and 104 respectively, with the Washington, D.C. toll switching office 101. It is over these toll trunks that customers in each community can communicate with customers in other communities in the network.

For instance, if customer S108 in Dallas desires to call customer S112 in Miami, customer S108 dials the proper area code for Miami followed by the telephone number of customer S112. This causes local switching equipment 102 to select a trunk, such as trunk 110, connecting local office 102 with the toll switching office 101 at Washington, D.C. At Washington, D.C. incoming trunk 110 is switched through toll switching equipment 111 to outgoing trunk 114 going to Miami, thereby establishing a connection between customer S108 in Dallas and customer S112 in Miami. In this example the connection would include the local switching equipments 102 and 104 and a trunk from each of the two local switching offices connected together via the switching equipment 111 at the toll switching office 101 in Washington, D.C.

The toll trunks connected between toll switching office 101 and the various satellite offices have been designated incoming and outgoing trunks to depict the flow of traffic and illustrate the offices at which calls originate and terminate. It will be understood, however, that these trunks provide two-way transmission facilities between the offices they connect and the trunks could also include the, so-called, two-way trunks which are capable of handling a call originated at either of the connected offices.

Remotely located, but connected to the toll switching office 101, is attendant switchboard 117 at Baltimore. The exact location of switchboard 117 is of no importance to the invention, and switchboard 117 may very well be located in one of the other communities with one of the satellite offices.

It is a function of attendant switchboard 117 at Baltimore to furnish customer assistance on special service calls and on toll calls that switch-through the Washington, D.C. toll office, but moreover, attendant switchboard 117 is used to assist in the establishment of network conference calls.

It will be noted in FIG. 1 that two six-way conference transmission bridges, designated 115 and 116, are provided at the Washington, D.C. toll switching office 101. Each of the two bridges has six terminals or outlets, designated A through F for conference circuit 115 and A' through F' for conference circuit 116. These outlets are sometimes referred to as conference "legs" or "channels."

Each of the legs is connected to an outgoing conference trunk, and all of the conference trunks are available to the customers of the network via switching equipment 111 in the same manner that the outgoing toll trunks serving the various communities are available.

In this embodiment of the invention, we have provided access to the conference legs via a trunk circuit to illustrate the flexibility afforded when conventional trunk circuits are utilized. It will be obvious to those skilled in the art, however, that certain conference circuits require no additional trunk equipment and direct access to the leg can be provided for customer connection. Furthermore, it is apparent that the trunk and conference leg equipment could be combined into a single unit, rather than separate units, if desired.

All of the trunks connected to the same conference bridge are assigned to a particular "conference code," and it is through the dialing of these "conference codes" that the customers in the network can connect to the conference circuit and meet or rendezvous with other customers for a conference.

In this example it has been assumed that the "conference code" assigned to conference circuit 115 is "1–1–5" and the "code" assigned to conference circuit 116 is "1–1–6."

To prevent inadvertent or unauthorized seizure of the conference circuit, the conference trunks are normally made "busy" by conference control circuit 120 using equipment represented by conductors 118 and 119. This conference control circuit (120) is inaccessible to the network customers and is under the exclusive control of the Baltimore attendant who can administer the use of the conference circuit to prevent customers from abusing the conference privilege by repeated use of the conference facilities.

It should be also noted that the legs designated A′ and F for conference circuits 116 and 115 respectively are not connected directly to their outgoing trunks but are connected through "bridging" equipment represented by transfer contacts of relay FO– in conference control circuit 120. It can be seen, that when relay FO– in conference control circuit 120 is normal, these legs (F and A′) are extended to their respective trunks and, therefore, can be used by a conferee. However, when relay FO– is operated, legs F and A′ will be disconnected from their respective conference trunks and connected together through the operated contacts of that relay thereby "bridging" or joining the two six-way conference bridges together to form a large capacity conference bridge for ten conferees. When legs F and A′ are disconnected from their trunks and used for "bridging" the two conference circuits, the trunks are maintained busy to prevent their seizure by a conferee.

Additional conference circuits can be connected to the arrangement as shown in FIG. 1 by taking any one of the remaining legs designated A through E or B′ through F′ and connectinng that leg to a leg of the conference circuit to be connected, thus providing a still larger capacity conference circuit.

The control of the make-busy condition on each of the conference trunks, the supervision of connections to the conference trunks and the control of the interconnecting of separate conference bridges 116 and 115 is accomplished by signals sent between attendant switchboard 117 at Baltimore and toll office 101 at Washington, D.C. over signaling channel 121.

*Establishing a conference call using one conference circuit*

When a customer wants to originate a conference call he calls the Baltimore attendant at switchboard 117 using the regular toll switching network and requests that conference facilities be made available. For instance, if Dallas customer S108 wishes to originate a conference, he might call over toll trunk 110 which is included in the trunk group interconnecting Dallas with toll office 101 and, by using switching equipment 111 at toll switching center 101, switch-through to attendant operator trunk 122. When the attendant at switchboard 117 responds to the call on trunk 122, conference originator S108 would inform her that he desires to originate a conference at a particular time and would like facilities made available for a prescribed number of conferees. The attendant at switchboard 117 then selects one of the conference circuits, for instance conference circuit 115, and informs the conference originator that the code "1–1–5" must be dialed in order to connect to the conference circuit and meet the other conferees.

At this time, conference originator S108 may elect to call the other conferees, himself, in order to inform them of the intended conference and the proper code to dial, or he may request that the attendant operator at switchboard 117 inform them.

If the conference originator requesets that the attendant inform them, the attendant at switchboard 117 can utilize trunk 123, incoming to toll switching office 101, to call each of the conferees over the regular toll trunking network, similar to the way a customer in one of the satellite communities would call them.

When the time designated for the conference arrives, the attendant at switchboard 117 signals over signaling channel 121 to remove the busy condition from the conference trunks so that the trunks may be selected by the conferees for the conference call. By using equipment inaccessible to the customers, the attendant at switchboard 117 can signal over signaling channel 121 to selectively remove the busy condition from enough trunks to provide one conference trunk for each conferee in the manner explained in detail herein. The remaining trunks are maintained busy to prevent unauthorized customers from intruding on the conference call once it has been established.

As the busy condition is removed from the various conference trunks, conference control circuit 120 returns a "flashing" supervisory signal to the attendant switchboard 117 over signaling channel 121 for each trunk to indicate when the particular trunks have been made available to the customers. The signal associated with each trunk remains "flashing" until one of the conferees, after having dialed code "1–1–5," selects an idle conference trunk and is connected thereto. When the conferee is connected to a conference trunk, the trunk is then held busy by the conferee over the talking conductors of the trunk in a well-known manner and the "flashing" supervisory signal, associated with that trunk but at the attendant switchboard, becomes a "steady" signal. This "steady" supervisory signal informs the attendant that a conferee has successfully connected to the conference trunk, and the attendant can then signal control circuit 120 to prepare the control circuit for making the trunks busy at the end of the conference. The supervisory signal remains "steady" until the conferee disconnects at the end of the conference. At the time of disconnect, the supervisory signal is extinguished and the trunk is once again made busy under the control of conference control circuit 120.

*Establishing a multiconference circuit call*

As mentioned above, the conference bridges used in this illustrative embodiment of the invention are six-way or six terminal conference bridges. In other words, each conference bridge when used separately has a capacity for handling a maximum of six conferees on a conference call. Should it be necessary to provide accommodations for more than six conferees the attendant at switchboard 117 has facilities for permitting her to actuate the conference control circuit 120 in a special manner so that two or more individual six-way conference bridges may be connected together to form a larger capacity conference bridge.

For instance, suppose one of the customers such as customer S108 in the Dallas community had requested that the attendant at switchboard 117 provide conference facilities for more than six conferees. Under these circumstances the attendant at switchboard 117 would select enough six-way conference bridges to provide each conferee with a conference leg. The conference originator and the other conferees would then be informed of the proper conference code to dial giving them access to a particular conference bridge. In FIG. 1 five conferees would be requested to dial the code "1–1–6" associated with six-way conference bridge 116 while the remaining conferees (a maximum of five) would be told to dial the conference code "1–1–5" associated with six-way conference bridge 115.

At the time designated for the conference call, the attendant at switchboard 117 would transmit control signals over signaling channel 121 to remove the busy condition from the conference legs that have been selected to serve the conferees. In addition, the attendant at switchboard 117 sends a special signal to conference control circuit 120 to operate circuitry represented by relay FO– and its contacts in FIG. 1. This circuitry, when operated, causes leg F of conference bridge 115 and leg A' of conference bridge 116 to be disconnected from their trunks and connected together while the trunks associated with those legs are maintained busy. When the legs F and A' are connected together, the two six-way bridges are telephonically interconnected thereby permitting a maximum of ten conferees to meet and converse with each other after having dialed the proper codes and connecting to the conference trunks in the manner described above.

After the attendant at switchboard 117 has caused control circuit 120 to join the two six-way conference bridges together, a signal is returned from the control circuit 120 over signaling channel 121 to inform the operator that the two conference bridges have been successfully connected together. This signal will remain present at the attendant's switchboard, reminding her that the circuits are joined; until the two six-way conference bridges are severed by the attendant and restored for use as individual conference bridges. The attendant can sever the connection, of course, after all the conferees connected to one conference bridge have disconnected.

It will be noted in FIG. 1 that the control channel between the attendant's switchboard 117 and conference control circuit 120 comprises carrier facilities having a terminal at each end of the signaling channel. The use of carrier facilities for signaling and controlling conference control circuit 120 offers particular advantages in this illustrative embodiment. For instance, should the signaling channel fail due to some trouble or disturbance in the arrangement the attendant at switchboard 117 is informed as to which of the conference legs may be in trouble so that she can select other legs for use on a conference call. If a conference call is in progress when the signaling channel encounters trouble, the conference call will not be interrupted, and the conferees may continue their conference to its conclusion. At the conclusion of the conference the circuit or some of its legs may then be taken out of service and the necessary maintenance work performed to eliminate the trouble. Should a trouble be encountered on the signaling channel 121 when the conference circuits are not in use, the conference trunks connected to the terminals of the six-way conference bridges will be maintained "busy" thereby preventing inadvertent and unauthorized use of the circuit until the operator releases the trunks, presumably after the trouble has been disposed of.

DETAILED DESCRIPTION

Figure 6:
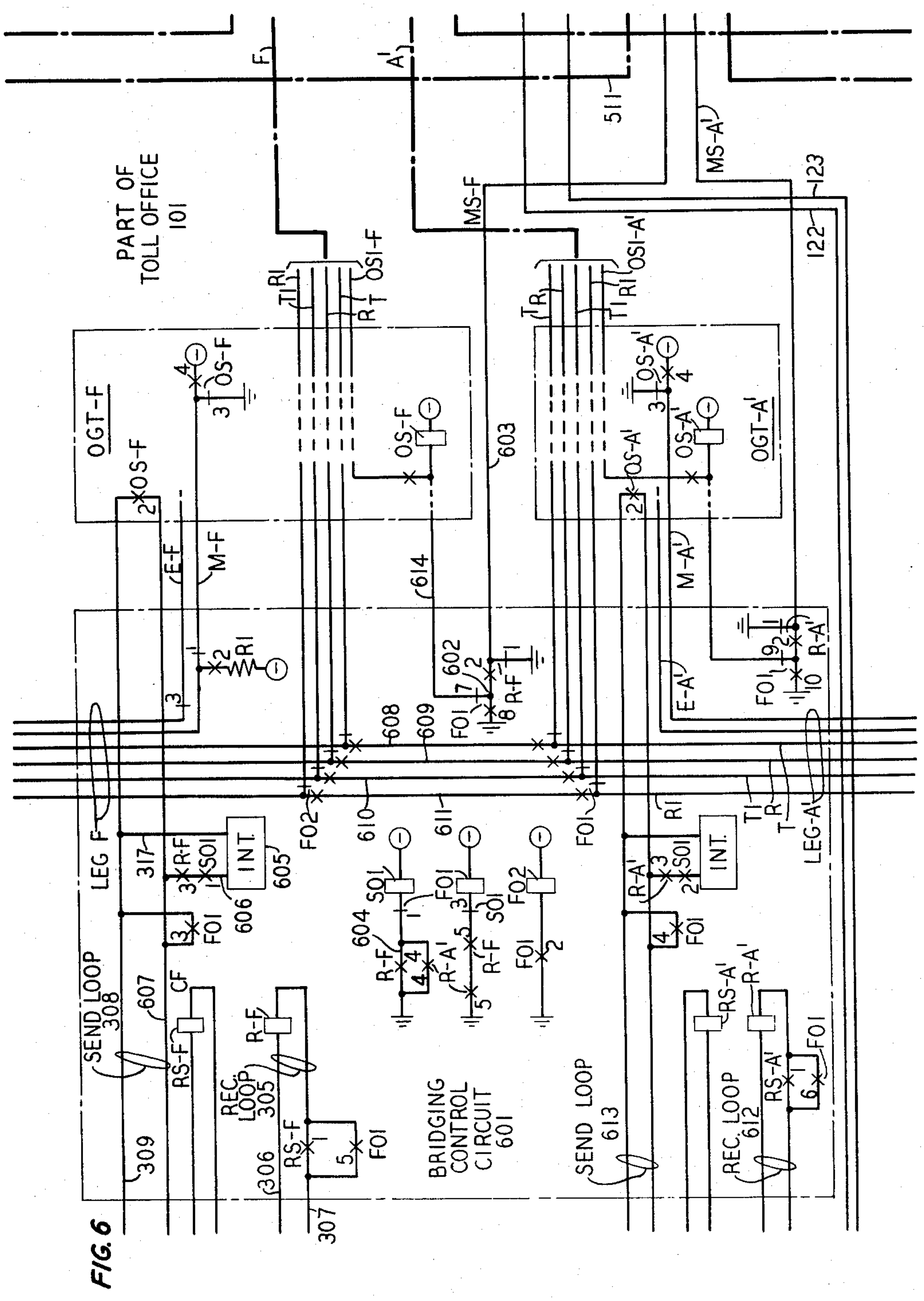
Figure 7:
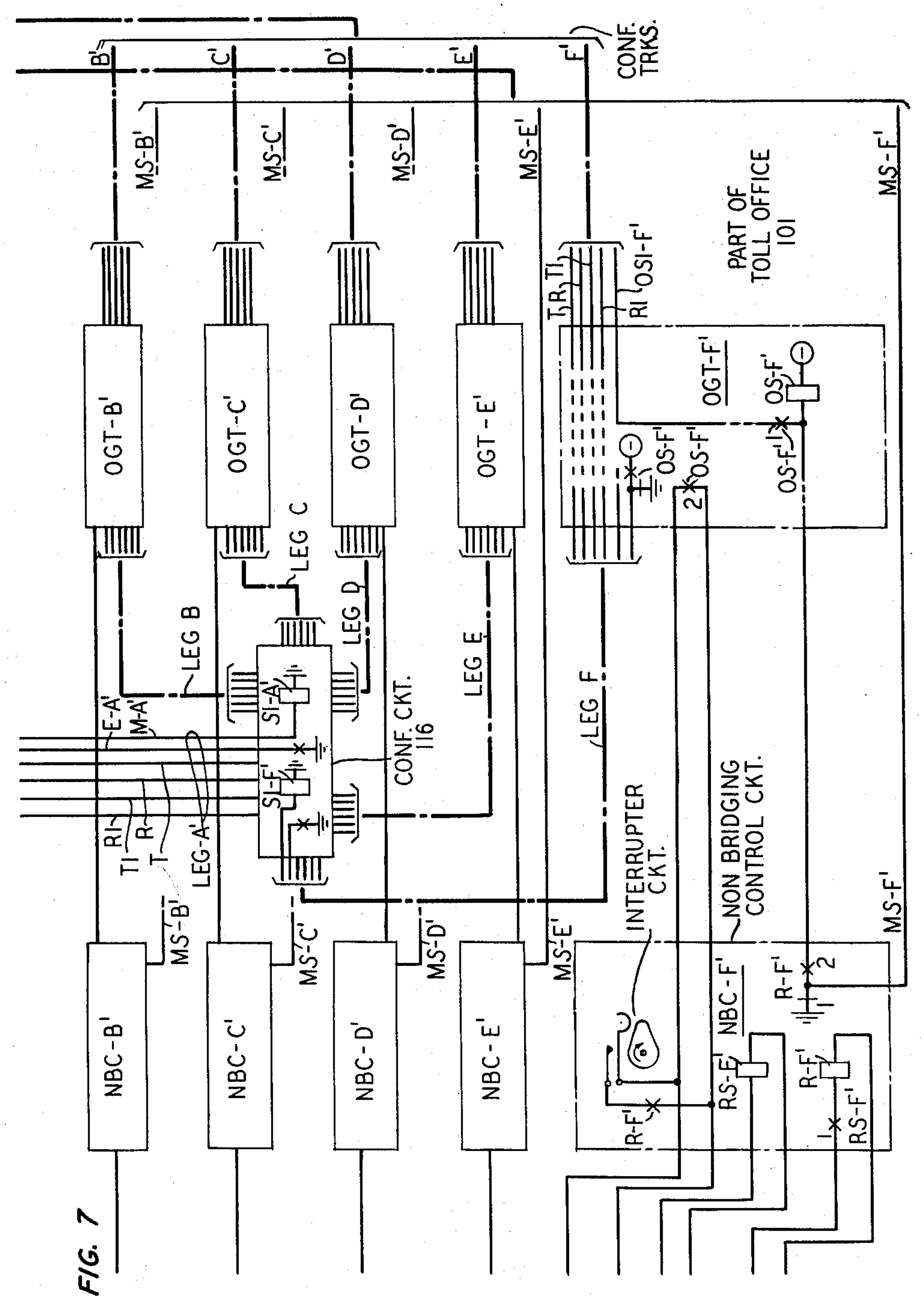
Figures 8, 9:
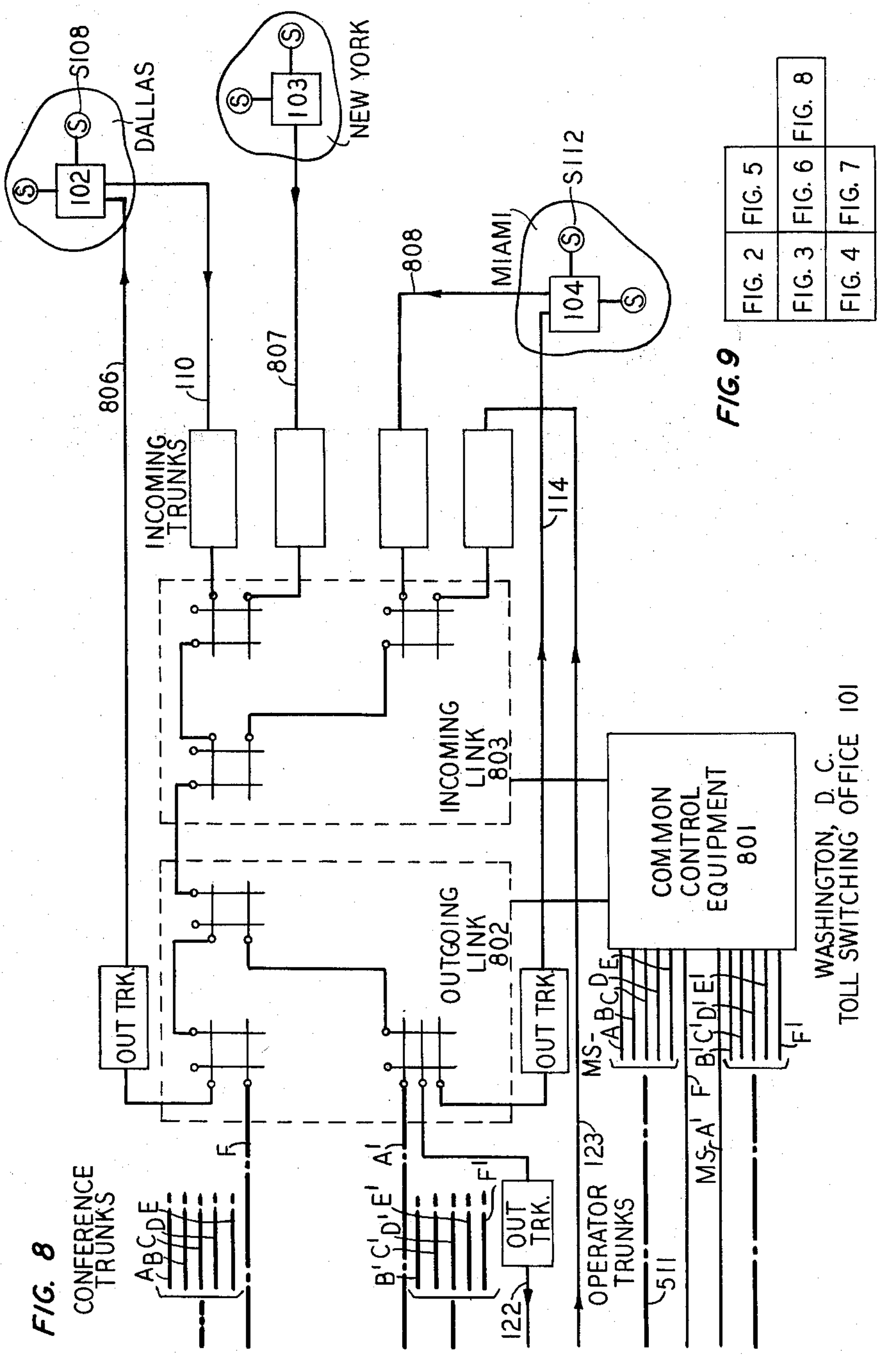
FIG. 8 shows a block diagram representing a typical toll switching office and some of the surrounding satellite or local community switching offices.
FIG. 9 shows the manner in which FIGS 2 through 8 should be arranged to show the specific illustrative embodiment of the invention.

Referring now to FIGS. 2–8 as arranged in accordance with FIG. 9, there is shown a more detailed schematic representation of the illustrative embodiment of the invention that was set forth in the block diagram of FIG. 1.

A detailed description will now be given with reference to FIGS. 2–8 and wherever possible the same reference designations that were used in the general description with reference to the block diagram of FIG. 1 will be used in the detailed description with reference to the detailed FIGS. 2–8.

*Arrangement of equipment*

Figure 2:
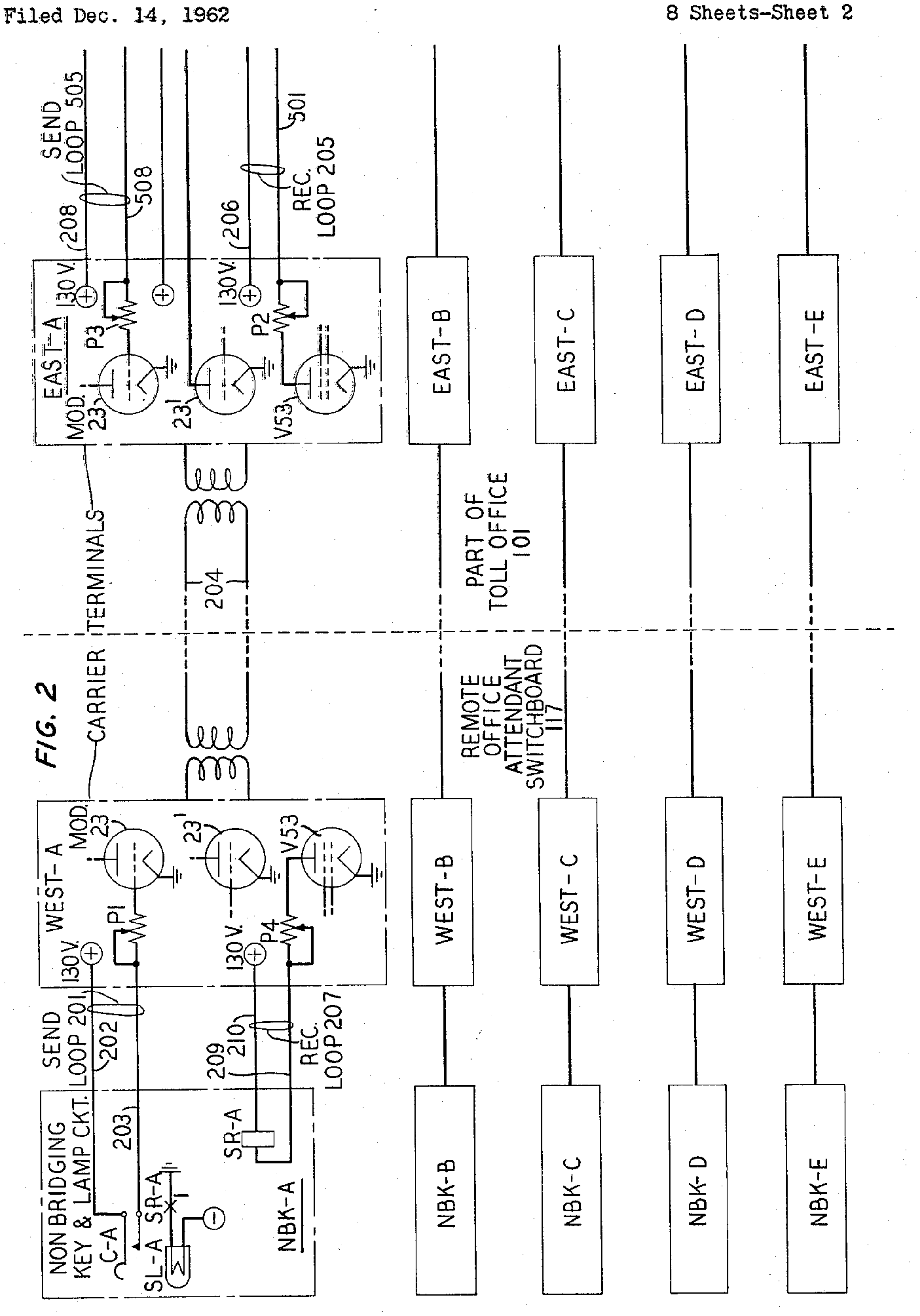
FIGS. 2 through 4 show the remotely located attendant's switchboard position and the signaling arrangement for interconnecting the remote switchboard with the conference office.
Figure 3:
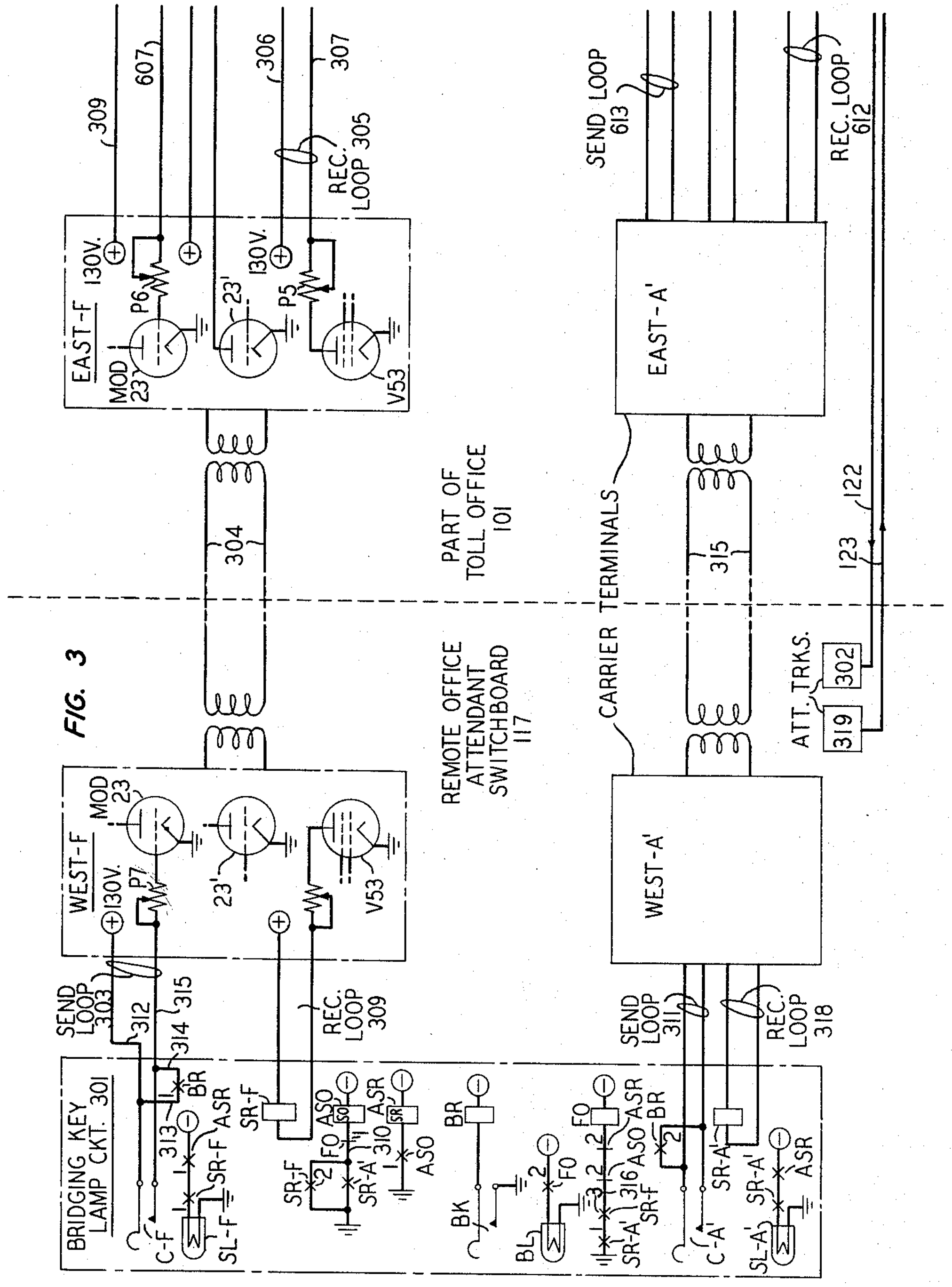
Figure 4:
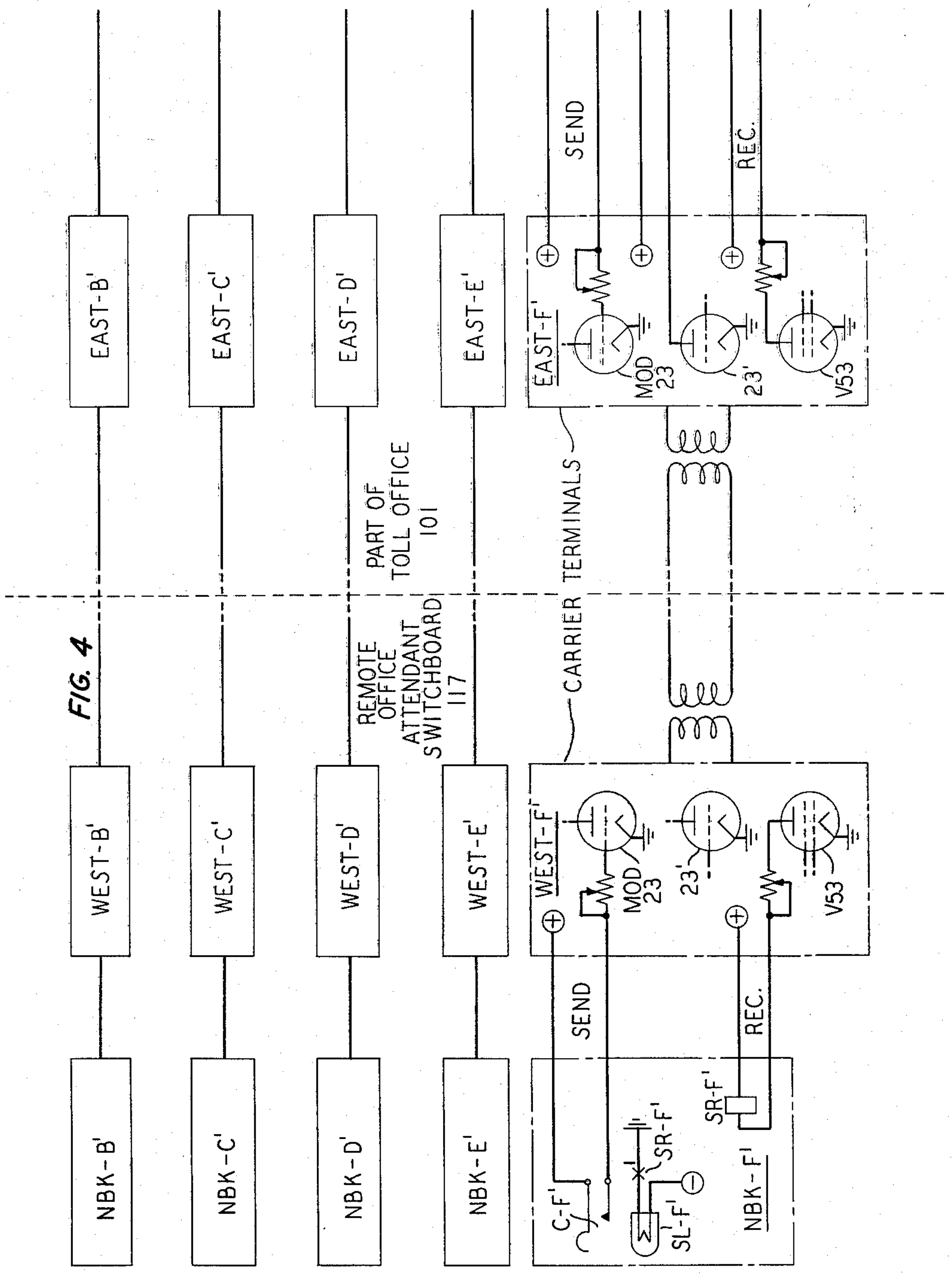

Looking at FIGS. 2–8 in their entirety, it can be seen that the left-hand portion of FIGS. 2–4 show remotely located attendant switchboard 117 at Baltimore, while the right-hand portion of FIGS. 2–4 and FIGS. 5–7, plus part of FIG. 8 depict a portion of the Washington, D.C. toll switching office 101. The remaining portion of FIG. 8 shows a few of the satellite offices in the switching network served by toll switching office 101.

Figure 5:
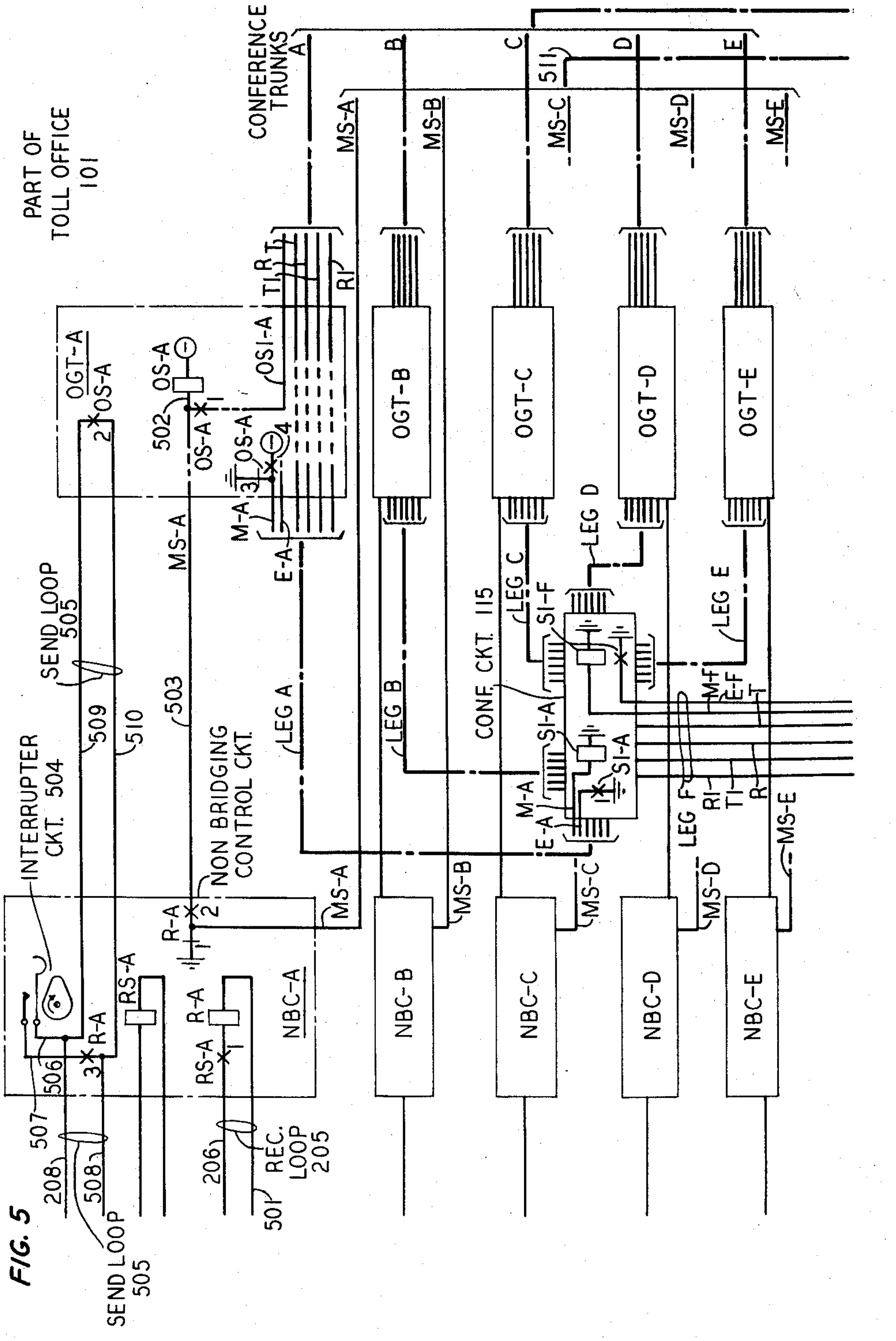
FIGS. 5 through 7 show two conference circuits, the conference control circuit and the conference channels or "legs" connected to the conference circuit.

The toll switching office represented by these various figures (FIGS. 2–4 in part; FIGS. 5–7; FIG. 8 in part) can be any one of the well known switching systems. One example of a typical four-wire toll switching system is disclosed in Patent 2,868,884 granted to J. W. Gooderham et al. on January 13, 1959.

Turning first to FIG. 8, it can be seen that toll switching office 101 serves many satellite or local switching offices such as those represented by rectangles 102, 103 and 104 in the communities designated Dallas, New York, and Miami, respectively.

Further description of the switching equipment found at the local switching offices need not be given herein for a full understanding of this invention. It will be understood that any of the more familiar types of equipment such as: crossbar, step-by-step, and the more recently developed electronic equipment, can be utilized in this arrangement without departing from the spirit and scope of this invention.

Toll office 101 in FIG. 8 is provided with incoming link frames 803 on which terminate toll trunks (such as 110 and 806–808) incoming from the various switching offices in the network or trunks from attendant switchboards such as trunk 123 from remote switchboard 117 (FIGS. 2–4). Toll office 101 also includes outgoing link frames 802 in FIG. 8 on which terminate toll trunks, such as 114 and 806, outgoing to these local offices and to the attendant switchboards such as trunk 122 to the aforementioned switchboard 117. In addition, toll center 101 is provided with common control equipment 801 which includes the various senders, registers, markers, etc. for controlling the interconnection of incoming and outgoing toll trunks for establishing connections between customers in different communities.

For instance, customer S108 in a Dallas community may originate a call to the Miami community by dialing the area code assigned to the Miami area followed by the telephone number of the called customer, such as Miami customer S112. By dialing the Miami code, customer S108 would cause the local switching office 102 to select a trunk, such as trunk 110, to the Washington, D.C. toll switching office 101. At toll switching office 101 the common control equipment 801 would recognize the Miami area code and interconnect incoming toll trunk 110 with an outgoing toll trunk, such as trunk 114, to Miami using the intertoll switch train including the linkages on incoming link frame 803 and outgoing link frame 802 thus completing a connection between Dallas customer S108 and Miami customer S112.

Also connected to outgoing link frames 802 are four-wire conference trunks designated A–F and A'–F'. These trunks are associated with outgoing trunk equipment represented by the captioned rectangles OGT–A through OGT–F and OGT–A' through OGT–F' in FIGS, 5, 6 and 7. This trunk equipment is similar to the outgoing trunk equipment which is used to serve the satellite offices and an example of a typical trunk circuit can be found in the aforementioned Gooderham et al. patent. The conference trunks, however, instead of being connected to a local switching office over cable facilities and the like, are connected to the conference legs of common transmission bridges. For instance, conference trunk equipments OGT–A through OGT–F are connected to legs A–F of common conference circuit 115 in FIG. 5, while conference trunk equipments OGT–A′ through OGT–F′ are connected to legs A′–F′ of a similar conference circuit designated 116 in FIG. 7.

It will be remembered from the general description that the legs associated with the conference circuits were also designated A through F and A′ through F′ for conference circuits 115, 116 respectively. Wherever possible in the detailed description the equipment has been given a functional designation and that equipment that is associated with the conference legs will be given a functional designation followed by the lettered designation of its associated leg. For instance, the outgoing trunk equipment associated with leg "A" of conference circuit 115 has been designated "OGT–A."

All of the conference trunks that are connected to one conference circuit are assigned to a special conference code and for convenience it has been assumed that the code for conference circuit 115 is "1–1–5," and similarly the code for conference circuit 116 to "1–1–6." By dialing one of these codes the customer in the network can select a trunk from the group of conference trunks OGT–A through OGT–F or OGT–A′ through OGT–F′ and be connected to the corresponding conference circuit in the same manner that a connection would be established to a toll trunk going to a satellite office had the customer dialed the area code corresponding to that community.

Associated with each of the conference trunks is a control circuit (NBC–A—NBC–E and NBC–B′—NBC–F′). These control circuits cannot be actuated by network customers but must be actuated by signals sent over signaling channels from equipment accessible only to the attendant at switchboard 117 in order to control the idle and busy conditions of each conference trunk. These control circuits are also arranged for returning signals to the attendant switchboard to indicate to the operator thereat, the idle and busy condition of each conference trunk.

Conference circuit 115 in FIG. 5 can be any one of the well known types of four-wire conference arrangements which provide a multiterminal transmission bridge and supervisory relays, such as relay S1–F, for returning supervision to the calling customer when a connection is made to one of the terminals. An example of a typical four-wire conference arrangement is disclosed in Patent 1,773,776 issued to G. Crisson on August 26, 1930.

In this illustrative embodiment six-way conference circuits 115 and 116 are shown in FIGS. 5 and 7 respectively. Each conference circuit, having six outlets or legs has a capacity to handle conference calls involving six or less conferees when the conference circuit is used separately. In this specific embodiment, however, conference circuits 115 and 116 are also arranged so that they may be "bridged" or connected together to form a larger capacity circuit. This "bridging" is accomplished by connecting together one leg from each of the two separate circuits.

It will be shown subsequently, in describing the establishment of a call, how leg F of circuit 115 is connected with leg A′ of conference circuit 116 using bridging control circuit 601 in FIG. 6 while the remaining legs (legs A–E in circuit 115 and legs B′–F′ in conference circuit 116) are used for conferees.

When conference circuits 115 and 116 are bridged or joined, the combined circuit can handle a conference involving as many as ten conferees. Additional conference circuits may be added in a similar manner to handle still larger conferences by connecting one leg of the existing "bridged" arrangement to one leg of the circuit to be added. This results in a net gain of $(N-2)$ legs for each circuit added where N is the number legs in the conference circuit to be added to the conference circuits already bridged.

In this description the legs to be used exclusively for the conferees will be referred to as "conference legs" or "conference channels" and include legs A–E associated with conference circuit 115 and legs B′–F′ associated with the conference circuit 116. The legs used for interconnecting the two conference circuits (leg F and leg A′) will be referred to as "bridging legs," but it will be understood that these bridging legs can also be used for conferees when conference circuits 115 and 116 are used separately.

Turning now to a description of the control circuits it will be remembered that the control circuits function to control the busy condition of their associated conference trunks. The trunks associated with a "conference leg," i.e., one not used for bridging, are each associated with a corresponding control circuit called a "nonbridging control circuit." These circuits are designated NBC–A through NBC–E in FIG. 5 for "conference legs" A–E of conference circuit 115 and NBC–B′ through NBC–F′ in FIG. 6 for the "conference legs" B′–F′ of conference circuit 116. The remaining legs F and A′, which are the "bridging legs," have their corresponding conference trunks controlled by a common "bridging control circuit" 601 in FIG. 6.

Each of the non bridging control circuits (NBC–A through NBC–E and NBC–B′ through NBC–F′) functions to control its corresponding conference trunk to render the trunk equipment available for a conference call under control of equipment which is inaccessible to network customers and located at the attendant switchboard.

The bridging conrtol circuit 601 in FIG. 6 is associated with leg F of conference circuit 115 and leg A′ of conference circuit 116. Bridging control circuit 601 functions similarly to the nonbridging control circuits (NBC–) in rendering the corresponding conference trunk equipments OGT–F and OGT–A′ available to conferees when conference circuit 115 and 116 are used separately. When conference circuits 115 and 116 are to be "bridged," however, bridging control circuit 601 functions to interconnect leg F and leg A′ while maintaining the corresponding conference trunk equipments OGT–F and OGT–A′ unavailable to customers who are dialing the conference codes.

Each of the control circuits is connected over carrier facilities to a corresponding key and lamp circuit at the attendant's switchboard 117 which is shown to the left in FIGS. 2, 3 and 4. The nonbridging control circuits (NBC–) are connected to a corresponding nonbridging key and lamp circuit designated NBK– with a letter annexed thereto, and corresponding to the channel or leg which the particular circuit controls.

Bridging control circuit 601 in FIG. 6 is also connected over carrier facilities to a bridging key and lamp circuit 301 in FIG. 3. The bridging key and lamp circuit 301 has equipment individual to "bridging leg" F in conference circuit 115 and "bridging leg" A′ in conference circuit 116 which functions similar to the nonbridging key and lamp circuits associated with the individual "conference legs." Furthermore, bridging key and lamp circuit 301 has equipment common to both "bridging legs" for controlling and supervising the interconnection of the two conference circuits 115 and 116.

These key and lamp circuits are only accesible to the attendant at switchboard 117, thus enabling her to exercise exclusive control and supervision over the bridging and nonbridging control circuits at the toll office 101. In other words, although the customers can direct calls to the attendant switchboard to request conference service, the customers require the attendant's assistance in releasing conference trunks for service and in bridging conference circuits together. This feature prevents unauthorized customers from using the conference facilities and enables the attendant to give preferential treatment to priority conference calls that may arise during times of national emergency or disaster. Furthermore, by providing the attendant, with facilities which permit selectivity among the conference channels, the attendant can avoid the use of channels which have been experiencing trouble.

The carrier facilities mentioned above are shown in FIGS. 2, 3 and 4 and include a carrier channel terminal designated "West-" for the terminal at the attendant switchboard location and a carrier terminal designated "East-" for the terminal at the toll switching office 101 where the control circuits are located.

A typical example of a carrier system which we have applicable to this conference control arrangement is found in Patent 2,667,536 granted to L. A. Gardner and J. L. Hysko on January 26, 1954, and the carrier terminals set forth in the Gardner-Hysko patent are hereby incorporated by reference as though fully set forth herein.

In that patent, Gardner and Hysko disclose a frequency shift telegraph carrier system having a carrier terminal at each end of the carrier line. Each carrier terminal includes a "send" loop, a "receive" loop and supervisory receiving circuit. When each terminal is "turned on" i.e., has power connected to it, the terminal sends a carrier signal over the interconnecting carrier line to the distant terminal carrier signal receiving circuit and therein operates a supervisory relay. The carrier signal supervisory relay will remain operated at each terminal as long as a carrier signal is being received from the terminal at the other end of the carrier line.

In FIG. 5 the carrier signal supervisory relay RS–A for carrier terminal East-A (FIG. 2) is connected to the plate circuit of tube 23′ therein, and similar arrangements are provided for the other carrier terminals designated "East-."

Having once turned the terminals "on," the terminals can transmit and receive frequency shift signals over the carrier line to and from the carrier terminal at the other end of the line. More specifically, when the send loop of the terminal at the near end of the carrier line is open, a frequency, sometimes referred to as a "spacing signal," is sent over the line to the distant terminal. When the near terminal send loop is closed the terminal shifts frequency and transmits a frequency referred to as a "marking signal" over the line to the distant terminal. At the distant terminal the receipt of a "marking signal" will close through the distant terminal receive loop and operate a receive relay thereat. It can therefore be seen that the opening and closing of the send loop at one terminal will "pulse" or "key" a relay in the receive loop at the distant terminal. The distant terminal by intermittently closing its send loop can also "pulse" or "key" a similar receive relay in the near terminal receive loop in the same manner.

A better understanding of the signaling and control arrangements used herein, will be realized from the ensuing description with respect to the establishment of a conference call.

*Establishing a conference call using only one conference circuit*

Let it be assumed that Dallas customer S108 in FIG. 8 desires to call a conference with three other customers who are located in various communities throughout the network.

Customer S108 would dial into his local switching equipment, the appropriate code assigned to the conference attendant at switchboard 117. Upon receiving this code the local switching equipment at the Dallas office 102 recognizes the code as being assigned to the conference attendant and selects a toll trunk to the Washington, D.C. toll switching office 101 where the attendant operator trunks are terminated.

At toll switching office 101 common control equipment 801 would then interconnect the incoming toll trunk 110, from the Dallas switching office, with an attendant trunk, such as the attendant trunk 122 which terminates in trunk equipment 302 at the remote attendant switchboard 117 of FIG. 3.

A more detailed description of the equipment needed to establish a connection between Dallas customer S108 and the attendant need not be given herein for full understanding of this invention since those arrangements are well known in the art of telephony.

The attendant, in responding to the call from the Dallas customer S108, learns that this customer desires to call a conference at some designated time with three other customers in the network. The attendant then selects either one of the conference circuits designated 115 or 116 since either conference circuit alone, has sufficient capacity to handle the needs of conference originator S108 in this particular conference call.

Let it be assumed that the attendant selects conference circuit 115. She thereafter informs conference originator S108 that code "1–1–5" is the proper code to be dialed in order to gain access to the selected conference circuit.

At this time, conference originator S108 can undertake to inform each of the conferees himself or request that the attendant inform them of the time the conference is to be held and what "conference code" shall be used. If the attendant is to call each conferee she has facilities similar to customer S108 for placing calls over the entire network by utilizing a trunk such as trunk 123 terminated in equipment 319 at the attendant switchboard and also terminated on incoming link frame 803.

Now, although each conferee has been informed of the "conference code," the conferees cannot gain access to the conference circuit until the proper time since all of the conference trunks are held busy to the common control equipment of toll switching office 101 under control of the attendant at switchboard 117. This make busy circuit can be seen by turning to FIG. 5 wherein ground from nonbridging control circuit NBC–A is extended through normal contacts 1 of receive relay R–A therein and over conductor MS–A and through cable 511 to FIG. 8 and to common control equipment 801. Ground on any of the MS– leads informs the common control equipment that the trunk associated with that particular lead is made busy and inaccessible to customers dialing that code assigned to that trunk.

When the time designated for the conference arrives the attendant selects trunks associated with the conference circuit that has been selected for the conference call and thereafter removes the busy condition from these conference trunks so that the conferees may gain access and meet on the common circuit.

In this example it has been assumed that the conference originator and three other conferees are to be included in a conference call using conference circuit 115. The attendant at switchboard 117 will, therefore, select four conference legs from legs A–F. Let it also be assumed that all of these legs are available for service and that the attendant at switchboard 117 selects the conference legs designated A, B, C and F.

Associated with each conference leg and at the attendant switchboard 117 are located control keys designated C– with the proper letter designation annexed thereto, for the corresponding leg which the key controls.

By operating control key C–A the attendant operator closes send loop 201 and causes carrier terminal West-A to shift frequency. This circuit can be traced in FIG. 2 from the 130-volt positive source at carrier terminal West-A, over conductor 202, through the operated contacts of control key C–A, over conductor 203 and through potentiometer P1 to the grid circuit of tube 23 causing modulator tube 23 to conduct. The conduction of modulator tube 23 at carrier terminal West-A causes a frequency shift in the carrier system from spacing to marking signals. This frequency shift is transmitted over carrier line 204 to the carrier terminal at the distant end of the line designated carrier terminal East-A. At carrier terminal East-A the reception of marking signals causes tube V53 to conduct and close receive loop 205 thereby operating receive relay R–A in nonbridging control circuit NBC–A of FIG. 5. The operating path for relay R–A over the closed receive loop 205 can be traced from the 130-volt positive potential source at carrier terminal East-A, over conductor 206 to FIG. 5, through contacts 1 of the previously operated relay RS–A, through the winding of relay R–A, back over conductor 501 to FIG. 2 and through potentiometer P2 to the plate circuit of receive tube V53. Tube V53 conducts on the receipt of marking signals and relay R–A operates.

When relay R–A in FIG. 5 operates it opens its contacts 1 and closes its contacts 2 in the nonbridging control circuit NBC–A to remove ground from the marker sleeve lead MS–A. It will be recalled that ground on a MS– lead to the common control equipment 801 in FIG. 8 indicated to the common control equipment 801 that the trunk associated with that MS– lead was busy or unavailable. When contacts 2 of relay R–A close, battery through the winding of an OS– relay in conference trunk equipment OGT–A is extended over marker sleeve lead MS–A to common control equipment 801 in FIG. 8 to indicate that the trunk is now idle. This circuit can be traced from battery in FIG. 5 from the winding of relay OS–A over conductor 502, through trunk equipment not shown, over conductor 503, through operated contacts 2 of relay R–A and over the previously traced lead MS–A to common control equipment 801 in FIG. 8. Marker sleeve lead MS–A, now having battery from the outgoing trunk equipment associated with conference leg A, indicates to the common control equipment 801 that this outgoing trunk equipment OGT–A is now available and can be selected when one of the conferees dials code "1–1–5."

In a similar manner, the attendant at switchboard 117 in FIG. 2 operates control keys C–B and C–C in nonbridging lamp and key circuits NBK–B and NBK–C respectively to remove the make busy condition from each of outgoing trunk equipment OGT–B and OGT–C. The key, lamp and control equipment associated with legs B and C has not been shown, but it is identical to that shown in detail with respect to leg A. The leg selected for the fourth conferee (leg F) is associated with bridging key and lamp circuit 301 and the removal of the busy condition from this leg will be described subsequently.

When receive relay R–A in nonbridging control circuit NBC–A operated, it prepared a circuit for returning a supervisory signal back to the attendant switchboard 117 to indicate to the operator thereat that outgoing trunk equipment OGT–A had been made accessible to the conferees. This signaling is accomplished by intermittently closing send loop 505 associated with carrier terminal East-A at toll switching office 101. The intermitent closure of send loop 505 causes carrier terminal East-A to alternately transmit marking and spacing signals over carrier line 204 to carrier terminal West-A. Upon the alternate reception of marking and spacing signals at terminal West-A receive loop 207 is intermittently closed to operate a supervisory relay designated SR–A in nonbridging key and lamp circuit NBK–A. The path for intermittently closing send loop 505 can be traced from the 130-volt positive source of potential in FIG. 2, over conductor 208 to FIG. 5, over conductor 506 and through contacts of interrupter circuit 504, back over conductor 507 and through operated contacts 3 of receive relay R–A, thence over conductor 508 to FIG. 2 through potentiometer P3 to the grid circuit of modulator tube 23 at carrier terminal East-A.

Interrupter circuit 504 can be any one of the many well known types of interrupters found in the prior art which causes its contacts to intermittently open and close thereby intermittently closing send loop 505 and causing carrier terminal East-A to alternately shift frequency from spacing to marking signals. Carrier terminal East-A will transmit marking signals over carrier line 204 when the contacts of interrupter circuit 504 are closed and spacing signals when contacts of interrupter circuit 504 are open.

The receipt of alternate marking and spacing signals at carrier terminal West-A causes receive loop 207 to alternately close and open. This circuit can be traced from the 130-volt positive source in carrier terminal West-A, over conductor 210, through the winding of supervisory relay SR–A, back over conductor 209, through potentiometer P4 and to the plate circuit of receive tube V53 in carrier terminal West-A. The repeated closing and opening of receive loop 207, intermittently operates supervisory relay SR–A which, at its contacts 1, closes a circuit for flashing supervisory lamp SL–A.

Supervisory lamp SL–A will continue to flash, indicating to the attendant at switchboard 117 that outgoing trunk OGT–A has been rendered available for conference service, until one of the conferees, after having dialed the proper conference code, selects outgoing trunk equipment OGT–A and connects thereto over incoming link 803 and outgoing link 802.

When one of the conference customers dials the conference access code "1–1–5," the common control equipment 801 in FIG. 8 selects an outgoing trunk from the group OGT–A through OGT–F associated with conference circuit 115. Only those trunks having battery potential on their marker sleeve leads (MS–) can be selected, however, since battery on this lead is indicative of an idle trunk.

Upon selecting idle trunk equipment OGT–A, the common control equipment 801 grounds marker sleeve lead MS–A to operate relay OS–A in trunk equipment OGT–A over the previously traced idle indicating path. When relay OS–A operates and the calling customer is cut through to trunk equipment OGT–A via the incoming and outgoing links, ground is extended from outgoing link 802 over sleeve lead OS1–A in a well known manner to lock operated relay OS–A under control of the calling customer's station.

Relay OS–A, in operating, also closes its contacts 2 to by-pass the interrupter circuit 504 and close send loop 505 steadily. Send loop 505 is now maintained closed as long as relay OS–A is held operated, and relay OS–A is held under control of the calling customer. The path for closing send loop 505 can be traced from the 130-volt positive source of potential at carrier terminal East-A, over conductor 208 to FIG. 5, over conductor 509, through contacts 2 of relay OS–A, over conductor 510, thence over conductor 508 to FIG. 2, through potentiometer P3 to the grid circuit of modulator tube 23. Having closed send loop 505 through contacts 2 of relay OS–A, carrier terminal East-A now sends a steady marking signal over carrier line 204 to carrier terminal West-A, and upon receipt of the steady marking signal at carrier terminal West-A supervisory relay SR–A is held operated continuously, thereby lighting supervisory lamp SL–A steadily.

A steady lamp indication at the attendant switchboard 117 indicates to the operator thereat that a conferee has successfully been connected to outgoing trunk OGT–A. The operator at switchboard 117 can then restore the control key C–A associated with that trunk.

The restoration of control key C–A to normal opens the send loop 201 causing carrier terminal West-A to shift frequency from marking to spacing signals. Spacing signals, now being transmitted over carrier line 204 and received at carrier terminal East-A, cause receive tube V53 thereat, to turn off and open receive loop 205. When receive loop 205 is opened, receive relay R–A releases.

Returning now to FIG. 5 and outgoing trunk circuit OGT–A, when relay OS–A operated as a result of common control equipment 801 selecting that trunk, relay OS–A removed ground, at its contacts 3, from lead M–A and connected battery to that lead through its operated contacts 4. Lead M–A is connected to conference circuit 115 wherein a supervisory relay designated S1–A is now operated. This path can be traced from battery in outgoing trunk circuit OGT–A, through contacts 4 of relay OS–A, over conductor M–A of leg A and through the winding of relay S1–A to ground. Relay S1–A in conference circuit 115 operates, removes a termination (not shown) from the transmission conductors of leg A and connects ground through its contacts 1 and back over lead E–A to outgoing trunk circuit OGT–A. Ground now being present on lead E–A causes outgoing trunk circuit OGT–A to return called party or "answer" supervision to the calling customer who had selected this trunk.

Supervision over leads M– and E– is a familiar type of supervision and is discussed in an article by C. Breen and C. A. Dahlbom entitled "Signaling Systems for Control of Telephone Switching" and published in volume XXXIX No. 6 of The Bell System Technical Journal (1960).

The operation of removing the busy condition from legs B and C and also the return of flashing and steady supervision to the operator at switchboard 117 for legs B and C is identical to that already described with respect to leg A and need not be reiterated.

To provide a conference channel for the fourth conferee the attendant at switchboard 117 has elected to remove the busy condition from "bridging leg" F. It will be recalled that "bridging leg" F can not only be used for a conferee as will now be described, but leg F can also be used for connecting conference circuits 115 and 116 together to form a larger capacity conference circuit. The use of "bridging leg" F in combining conference circuits 115 and 116 together will be given subsequently.

When the attendant at switchboard 117 operates control key C–F in bridging key and lamp circuit 301 (FIG. 3) second loop 303, associated with carrier terminal West-F, is closed causing that carrier terminal to send marking signals over carrier line 304 to carrier terminal East-F at toll switching office 101. At carrier terminal East-F receive tube V53 conducts, closing receive loop 305 to operate receive relay R–F in FIG. 6. This circuit can be traced from the 130-volt positive potential source at carrier terminal East-F in FIG. 3, over conductor 306 to FIG. 6, through the winding of relay R–F, through contacts 1 of relay RS–F, back over conductor 307 to FIG. 3, through potentiometer P5 and to the plate circuit of receive tube V53. When relay R–F operates it opens its contacts 1 to remove ground from marker sleeve lead MS–F and closes its contacts 2 to connect battery to marker sleeve lead MS–F from the winding of trunk relay OS–F. This circuit can be traced from battery through the winding of relay OS–F in outgoing trunk circuit OGT–F, over conductor 614, through normal contacts 7 of relay FO1 over conductor 602, through operated contacts 2 of relay R–F and over conductor 603 to FIG. 8 where conductor 603 is connected to common control equipment 801. The connection of battery through the winding of relay OS–F to marker sleeve lead MS–F, indicates to the common control equipment 801 that outgoing trunk OGT–F can now be selected for use in a conference call.

Relay R–F in operating closes its contacts 3 to prepare a path for returning flashing supervision to the attendant at switchboard 117.

Relay R–F also closes its contacts 4 to extend ground over conductor 604 and through normal contacts 1 of relay FO1 and thence through the winding of relay SO1 to battery to operate relay SO1. Relay SO1, in operating, closes its contacts 1 to complete a circuit for intermittently closing send loop 308 under control of interrupter circuit 605. This circuit can be traced from the 130-volt positive potential source in carrier terminal East-F, over conductor 309 to FIG. 6, over conductor 317 and through the interrupter contacts (not shown) in interrupter circuit 605, back over conductor 606, thence through contacts 1 of relay 601 and contacts 3 of relay R–F, over conductor 607 to FIG. 3, through potentiometer P6 and to the grid circuit of modulator tube 23 of carrier terminal East-F. Interrupter circuit 605, therefore, intermittently closes send loop 308 to cause carrier terminal East-F to alternately send marking and spacing signals over carrier line 304 to carrier terminal West-F. At carrier terminal West-F the receipt of alternate marking and spacing signals causes receive loop 309 to close and open in accordance with a signal received. Namely, as each marking signal is received by carrier terminal West-F, receive loop 309 is closed to operate supervisory relay SR–F, and as each spacing signal is received, receive loop 309 is opened to release supervisory relay SR–F. When relay SR–F operates it closes its contacts 2 in FIG. 3 to extend ground over conductor 310, through normal contacts 1 of relay FO and thence through the winding of slow operate relay ASO to battery, thereby operating relay ASO. Although relay ASO is a slow-to-operate relay, relay ASO will follow the intermittent operations of supervisory relay SR–F. When relay ASO operates it closes its contacts 1 thereby completing an obvious operating circuit for relay ASR. Relay ASR it will be noted is a slow release relay and, having once operated, will remain operated during the time that relay ASO is released as a result of intermittent spacing signals being received at carrier terminal West-F. With relay ASR operated a circuit is closed to light supervisory lamp SL–F each time relay SR–F operates. This circuit can be traced from ground through lamp SL–F and through contacts 1 of relays SR–F and ASR to battery.

When "bridging leg" F is selected by common control equipment 801, outgoing trunk equipment OGT–F is seized and a conferee connected thereto in a manner similar to the way the other outgoing trunks were seized and conferees were connected to them. Subsequent operation of trunk relay OS–F provides an alternate path for closing send loop 308 which by-passes the contacts of interrupter circuit 605. This path causes a steady closure of send loop 308 and a steady marking signal to be transmitted to carrier terminal West-F holding supervisory relay SR–F operated. With relay SR–F operated, relays ASO and ASR are maintained operated, and supervisory lamp SL–F burns steadily indicating to the attendant at switchboard 117 that a conferee has been connected to "bridging leg" F.

Having now received a steady supervisory signal for legs A, B, C and F, the attendant operator at switchboard 117 knows that all of the conferees have connected to the trunks that were made available for conference service. The attendant can now restore control keys C–A, C–B, C–C and C–F to normal.

Each control key when restored opens a send loop to its associated carrier terminal designated West- causing that terminal to transmit spacing signals over its carrier line to a corresponding carrier terminal designated East- at toll switching office 101. Each of the "East-" carrier terminals, upon receiving the spacing signals, opens its corresponding receive loop to release its associated receive relay (R–) and these receive relays in turn, disconnect the interrupter circuits from the send loops of the carrier terminals designated East-. In addition, when receive relay R–F released, it opened the operating circuit for relay SO1 in FIG. 6.

It will be remembered that when receive relays R– were released they extended ground over their corresponding MS– leads to common control equipment 801 to indicate that these trunks were busy; however, at this point in the call, locking ground is already being supplied to the MS– leads under control of the calling customer's station via the outgoing link circuit and sleeve leads OS1– as previously described.

Should a calling customer disconnect at this time and remove the sleeve lead locking ground from an OS– relay, that relay releases to restore the corresponding trunk to normal, but the trunk cannot be selected due to the busy indication now being supplied to the common control equipment 801 in the form of ground on the MS– lead from the release R– receive relay.

At the conclution of the conference, each conferee disconnects from the conference trunk to which he was connected by hanging up his telephone receiver. This causes certain operations to take place in the intertoll switch train resulting in the removal of the locking ground (not shown) from lead OS1– thereby releasing trunk relay OS–.

Looking now at FIG. 5, it will be seen that when relay OS–A in conference trunk equipment OGT–A releases, battery is removed from lead M–A to conference circuit 115 thereby releasing supervisory relay S1-A in the conference circuit. Furthermore, relay OS–A, in releasing, opens its contacts 2 to open send loop 505 to thereafter send spacing signals to carrier terminal West-A. The receipt of spacing signals at carrier terminal West-A causes receive loop 207 thereat to open and release supervisory relay SR–A. The release of supervisory relay SR–A opens the circuit for supervisory lamp SL–A, which is extinguished. As each conferee disconnects from a conference trunk, the supervisory lamp associated therewith is extinguished, and when all lamps are extinguished, the attendant at switchboard 117 is informed that the conference circuit 115 is now idle and can be used for subsequent conference calls.

Had the attendant at switchboard 117 inadvertently neglected to restore one of the control keys, such as control key C–A after the conferee had been connected to the trunk associated therewith, receive relay R–A in nonbridging control circuit NBC–A would be held operated by marking signals being transmitted from carrier terminal West-A to East-A. With receive relay R–A still operated when the conferee disconnects from trunk OGT–A, the circuit for intermittently closing send loop 505 is again made effective. With send loop 505 being intermittently closed, supervisory lamp SL–A at attendant switchboard 117 will flash indicating to the operator that she has neglected to restore control key C–A. This having been called to the operator's attention she can now restore control key C–A to release relay R–A in FIG. 5 and again make trunk equipment OGT–A busy by returning ground to its MS–A lead from the nonbridging control circuit.

*Establishing a multiconference circuit call*

Each of the conference circuits used in this one specific embodiment of the invention has six outlets or six legs to which conferees may be connected. Should it become necessary to provide conference facilities to accommodate more than six conferees, the attendant at switchbord 117 has facilities permitting her to interconnect conference circuit 115 with conference circuit 116 to form a large capacity conference circuit. This is accomplished by interconnecting one leg ("bridging leg") of each of the individual conference circuits together.

Turning now to FIG. 6 it can be seen that trunk equipment OGT–F, which is associated with leg F of conference circuit 115 has its transmission conductors T, R, T1 and R1 connected through normal contacts of relay FO2 in bridging control circuit 601 and thence to conference circuit 115 in FIG. 5. Similarly, trunk equipment OGT–A′ associated with leg A′ of conference circuit 116 has its transmission conductors T, R, T1 and R1 connected through normal contacts of relay FO1 and thence to conference circuit 116 in FIG. 7. With relays FO1 and FO2 normal, legs A′ and F are connected to their respective conference circuits, and these legs can be used by a conferee when conference circuits 115 and 116 are used separately. However, when relays FO1 and FO2 ar operated the transmission conductors of the conference circuits normally connected to trunks OGT–A′ and OGT–F are disconnected from these trunks and interconnected together over conductors 608–611 in FIG. 6, thereby telephonically connecting the two conference circuits together.

A better understanding of how conference circuits 115 and 116 are joined together will be realized if it is assumed that a customer such as Dallas customer S108 desires to establish a conference call involving ten conferees. Customer S108 would call the attendant at switchbord 117 over the proper attendant trunk in a manner similar to that previously described. Realizing that both conference circuits 115 and 116 must be used, the operator at switchboard 117 would inform customer S108 that conference code "115" must be dialed by five of the conferees and conference code "116" must be dialed by the remaining five conferees.

At this time the conference originator S108 can elect to inform the other conferees of the conference and the proper code to dial, himself, or request that the attendant inform them.

At the time designated for the conference call the attendant at switchboard 117 operates control keys C–A through C–E and C–B′ through C–F to remove the busy condition from conference trunks OGT–A through OGT–E and OGT–B′ through OGT–F′ in the manner previously described.

In addition, the attendant at switchboard 117 operates bridging key BK in FIG. 3 to complete an obvious operating circuit for relay BR. Relay BR, in operating, closes its contacts 1 and 2 to simultaneously close send loops 303 and 311 associated with carrier terminals West-F and West-A′ respectively. The circuit for send loop 303 can be traced from the 130-volt positive potential at carrier terminal West-F, over conductors 312 and 313, through contacts 1 of relay BR, back over conductors 314 and 315 and through potentiometer P7 to the grid circuit of modulator tube 23 to turn modulator tube 23 on. With modulator tube 23 turned on carrier terminal West-F transmits marking signals over carrier line 304 to carrier terminal East-F. The reception of marking signals at carrier terminal East-F causes receive tube V53 to conduct and thereby close receive loop 305 in the manner previously described. When receive loop 305 is closed receive relay R–F operates.

In a similar manner, contacts 2 of relay BR in FIG. 3 close send loop 311 causing carrier terminal West-A′ to send marking signals over carrier line 315 to carrier terminal East-A′ to close receive loop 612 thereat and operate receive relay R–A′. With relays R–A′ and R–F simultaneously operated due to the simultaneous closure of send loops 303 and 311, a circuit is completed for operating relay FO1 in FIG. 6. This circuit can be traced from battery through the winding of relay FO1, through contact 3 of relay SO1 and through contacts 5 of relays R–F and R–A′ to ground. It will also be noted in FIG. 6 that either relay R–F or R–A′ closes a circuit for operating relay SO1 through normal contacts 1 of relay FO1. Relay SO1, however, is slower to operate than relay FO1 and, upon the simultaneous operation of relays R–A′ and R–F, relay FO1 operates first and interrupts the operating circuit for relay SO1 preventing the latter relay from operating.

It will be remembered that when a receive relay (R–) operated, ground was removed from the associated marker sleeve (MS–) lead to inform the common control equipment 801 in FIG. 8 that the trunk, corresponding to that receive relay, was available for conference service. Where two conference circuits are to be bridged together, however, the trunks associated with the "bridging legs" cannot be used by conferees since their transmission conductors will be interrupted and connected together to interconnect the two conference circuits. These trunks, therefore, must be maintained busy to prevent customers dialing the conference code from connecting to the trunks. The circuit for maintaining trunk OGT–F busy can be traced from ground, through contacts 8 of relay FO1, over conductor 602, through contacts 2 of relay R–F, over conductor 603 to FIG. 8 and to common control equipment 801. A similar circuit for outgoing trunk OGT–A′ associated with leg A′ can be traced through contacts 10 of relay FO1.

When relay FO1 operates it closes its contacts 2 to complete an obvious operating circuit for relay FO2. With relays FO1 and FO2 operated the transmission conductor of leg F (associated with conference circuit 115) and leg A′ (associated with conference circuit 116) are disconnected from their associated trunk equipments OGT–F and OGT–A′ and connected together over conductor 608–611 thereby connecting conference circuit 115 with conference circuit 116.

At the time designated by the conference originator the customers to be included in the conference dial the proper conference code to cause their telephones to be connected to one of the now available conference legs A–E or B′–F′. With the two conference circuits bridged or joined together, the customers connected to conference circuit 115 may also converse with those customers connected to conference circuit 116.

When relay FO2 operated, it also closed its contacts 2 to extend battery through resistance R1 and over lead M–F to operate relay S1–F in conference circuit 115. Relay S1–F, in operating, removes a termination (not shown) from the transmission conductors T1 and R1 of leg F.

The operation of supervisory relay S1–F would normally place ground on lead E–F to the trunk equipment OGT–F thereby returning called party answer supervision to the calling customer, but when trunk OGT–F is used for bridging conference circuit 115 to another conference circuit, lead E–F is opened to prevent the return of false supervision to the trunk equipment which is normal at this time. Lead E–F associated with trunk equipment OGT–F is opened at contacts 3 of relay FO2 to accomplish this function.

Relay FO1, in operating, also closed its contacts 3 and 4 to simultaneously close send loops 308 and 613 respectively. The closure of these send loops causes marking signals to be simultaneously sent to carrier terminals West-F and West-A′ from carrier terminals East-F and East-A′ respectively. The simultaneous receipt of marking signals at carrier terminals West-F′ and West-A′ causes supervisory relays SR–F and SR–A′ to operate simultaneously, and with relays SR–A′ and SR–F operated, a circuit is closed for operating relay FO. This circuit can be traced from battery, through the winding of relay FO, through contacts 2 of relays ASR and ASO, over conductor 316 and through contacts 1 of relays SR–F and SR–A′ to ground. Either one of supervisory relays SR–F and SR–A′ also closes an operating circuit for relay ASO through normal contacts 1 of relay FO′ however, relay ASO is a slow operate relay allowing time for relay FO to operate and interrupt the operating circuit for relay ASO at contacts 1 of relay FO.

Relay FO in operating closes, at its contacts 2, an obvious circuit for lighting bridging lamp BL and this lamp informs the operator that conference circuits 115 and 116 are now bridged together.

Meanwhile the customers have been dialing the appropriate conference codes and connecting to conference legs A through E and B through F′. The connection of a conferee to any one of the conference legs causes steady supervision to be returned to the attendant at switchboard 117, and when all of the conferees have been connected to the conference circuits 115 and 116 supervisory lamps SL–A through SL–E and SL–B′ through SL–F′ will be lit. The manner in which steady supervision was returned to the attendant at switchboard 117 was previously described with respect to a conference call using only one conference circuit and need not be reiterated here.

It will be remembered from the description of the carrier arrangements that a carrier supervisory relay was provided at each carrier terminal and that this carrier supervisory relay was operated in the presence of a carrier signal being received from the distant terminal. More particularly, at terminals East-F and East-A′ carrier supervisory relay RS–F and RS–A′ would be held operated, and it is through operated contacts of these relays that the receive relays R–F and R–A′ were previously operated to bridge the two conference circuits 115 and 116 together. Now should carrier supervisory relays RS–F and RS–A′ release due to a carrier failure, it would be undesirable to release receive relays R–F and R–A′ respectively thereby disrupting the bridging connection between conference circuits 115 and 116. To prevent the release of receive relays R–F and R–A′, contacts 5 and 6 of relay FO1 have been provided to maintain receive relays R–F and R–A′ operated in the event that a carrier failure should occur causing carrier supervisory relays RS–F or RS–A′ to release.

It will also be recalled from the general description that as each customer connected to a conference trunk steady supervision was returned to the attendant at switchboard 117 in the form of a steady lamp (SL–). Upon seeing that a conference trunk has been successfully connected to, the attendant restores the associated control key (C–) to return a ground to the trunk marker sleeve lead (MS–) and thereby indicate to the common control equipment 801 that this trunk is held busy in the event that the customer connected thereto, disconnects. Now, with all of the control keys restored to normal the associated supervisory lamp at attendant switchboard 117 is extinguished as each customer disconnects from a conference trunk.

When all of the supervisory lamps associated with one conference circuit are extinguished the attendant at switchboard 117 can take steps to sever the bridged connection between conference circuits 115 and 116 so that the conference circuit that is now idle can be used for a separate conference call. To accomplish this the attendant at switchboard 117 restores bridging key BK to normal which opens the operating circuit for bridging relay BR, which releases. Relay BR, in releasing, opens its contacts 1 and 2 to interrupt send loops 303 and 311 respectively. With send loops 303 and 311 open, spacing signals are transmitted over carrier lines 304 and 315 to carrier terminals East-F and the East-A′ causing receive relays R–F and R–A′ to release. The release of relays R–F and R–A′ causes the release of relay FO1 which in turn releases relay FO2.

When relays FO1 and FO2 release, the transmission conductors of leg A′ and leg F are disconnected from each other and reconnected to their associated trunk equipments OGT–A′ and OGT–F thereby restoring these trunks to service for a conferee. The trunks, however, cannot be selected by common control equipment 801 at this time since ground is present on marker sleeve leads MS–A′ and MS–F through normal contacts 1 of their respective receive relays R–A′ and R–F.

The release of relay FO1 also interrupts send loops 308 and 613 causing carrier terminals East-F and East-A′ to return spacing signals to carrier terminals West-F and West-A′ at switchboard 117. Spacing signals being received at the latter terminals cause receive loops 309 and 318 to open, releasing supervisory relays SR–F and SR–A′. Relays SR–A′ and SR–F interrupt the operating circuit for relay FO which releases to extinguish bridging lamp BL.

When bridging lamp BL is extinguished the attendant at switchboard 117 is informed that the bridged conference circuits are now severed from each other and that the conference circuit not having any customers connected thereto can be used for a separate conference call. The other conference circuit will remain busy until all of the conferees have disconnected from the conference legs B′ through F′ as indicated by the extinguishing of supervisory lamp SL–B′ through SL–F′ at attendant switchboard 117.

In the aforementioned Gardner-Hysko patent there is a feature disclosed and designated therein as the "mark hold" feature. Briefly, this arrangement provides for holding of the receive loops closed at any terminal should that terminal fail to receive carrier signals from its associated carrier terminal at the other end of the line. In accordance with this one specific embodiment of the invention, should a carrier failure occur in any one of the carrier systems, the receive relays (R–) will not be operated by the mark hold feature since the carrier failure will also release the carrier supervisory relay (RS–) and thereby interrupt the receive loops to prevent the operation of receive relays (R–). By preventing the receive relays from operating due to the mark hold feature the individual conference trunks are not erroneously restored to service, and furthermore, the conference circuits are not bridged together should a carrier failure occur when the circuit is idle.

It is to be understood that the above described arrangements are merely illustrative of the application of the principles of the invention, numerous other arrangements may be devised by those skilled in the art without departing from the spirit and scope of the invention.

What is claimed is:

1. In a meet me communication switching system, a first switching office comprising controlled-access multichannel conference means, a plurality of station, and switching means governed by said stations for connecting said stations to said channels when said channels are available; gating means at said switching office effective when actuated for rendering said channels available to said stations; and a second remote office comprising control means inaccessible to said stations and effective for actuating said gating means to control the availability of stations to said channels.

2. In a meet me communication switching system, a first switching office comprising controlled-access multichannel conference means, a plurality of stations, and switching means governed by said stations for connecting said stations to said conference channels when said conference channels are available; selectively actuable gating means at said switching office effective when selectively actuated for rendering selected ones of said conference channels available to said stations and effective when unactuated for rendering said conference channels unavailable; a second remote office; a signaling channel interconnecting said gating means with said remote office; and means at said remote office for signaling over said signaling channel for selectively actuating said gating means.

3. In a meet me communication switching system, a first switching office comprising controlled-access multichannel conference means, a plurality of station, and switching means governed by said stations for connecting said stations to said conference channels when said conference channels are available; a second remote office interconnected with said first office; and a plurality of gating means at said first office, each said gating means being coupled to a corresponding conference channel and controlled in response to first signals from said remote office for rendering the corresponding conference channel available to said stations and controlled in response to second signals from said remote office for rendering the corresponding conference channel unavailable; said remote office comprising means inaccessible to said substations for transmitting first and second signals over said interconnection to said first office for selectively controlling said gating means.

4. The invention defined in claim 3 wherein said signal transmitting means comprises a plurality of individual signaling means each coupled to a corresponding one of said gating means and each capable of transmitting first and second signals to said first office for selectively controlling its corresponding gating means on an individual basis.

5. In a meet me communication switching system, a first switching office comprising controlled-access multichannel conference means, a plurality of stations and switching means governed by said stations for connecting said stations to said conference channels when said conference channels are available; an attendant switchboard remote from said office; and conference control means at said office responsive to first control signals from said switchboard for rendering said conference channels available for station connection thereto, responsive to second control signals from said switchboard for rendering said channels unavailable, and effective for sending a supervisory signal to said switchboard when a channel is rendered available; said remote switchboard comprising means inaccessible to said stations for sending first and second control signals to said control means for controlling channel availability and means responsive to said supervisory signals for indicating when a said channel is rendered available to said stations.

6. In a meet me communication switching system, a first switching office comprising controlled-access multichannel conference means, a plurality of stations and switching means governed by said stations for connecting said stations to said conference channels when said channels are available to said stations; an attendant switchboard remote from said office; and conference control means at said office comprising gating means responsive to first control signals from said switchboard for rendering said conference channels available to said stations for connection thereto and responsive to second control signals from said switchboard for rendering said channels unavailable to said stations, means for sending a first supervisory signal to said switchboard when a said channel is rendered available for station connection, and means for sending a second supervisory signal to said switchboard when a station has connected to said available channel; said remote switchboard comprising means inaccessible to said substations for sending first and second control signals to said gating means for controlling channel availability and means responsive to said first and second supervisory signals for respectively indicating when a said channel is rendered available and when a said channel has a station connected thereto.

7. The invention defined in claim 6 wherein said gating means comprises a plurality of individual gating means each responsive to first and second control signals from said switchboard for controlling the availability of a corresponding conference channel at said office; wherein said first and second supervisory signaling means each comprises a plurality of individual supervisory signaling means, each said first and second individual signaling means being coupled to a corresponding conference channel for sending signals to said switchboard indicative of the available and connection state of said channel; and wherein said signal sending means at said switchboard includes means for sending first and second control signals to each said individual gating means on a selective basis and means responsive to first and second supervisory signals received from each said individual first and second supervisory signaling means for indicating availability and connection state of its corresponding conference channels.

8. In a meet me communication switching system, a first switching office comprising a plurality of individual controlled-access multichannel conference circuits, a plurality of stations, and switching means selectively directable by said stations for connecting said stations to a channel of a selected one of said conference circuits; actuable control means at said switching office effective when actuated for connecting said individual conference circuits together; and a second remote office comprising means inaccessible to said stations and effective for actuating said switching office control means to connect said individual conference circuits together.

9. In a meet me communication switching system, a first switching office comprising a plurality of individual controlled-access multichannel conference circuits, a plurality of stations, and switching means selectively controlled by any of said stations for connecting said station to a channel of a selected one of said conference circuits when said channel is available for station connection; a second remote office; and control means at said first office responsive to first signals from said remote office for rendering said channels available to said stations, responsive to second signals from said remote office for rendering said channels unavailable to said stations, and responsive to third signals from said remote office for connecting said individual conference circuits together; said remote office comprising means inaccessible to said substations for sending first and second control signals to said first office control means for controlling conference channel availability and for sending third signals to said first office control means for connecting said conference circuits together.

10. In a meet me communication switching system, a first switching office comprising a plurality of individual controlled-access multichannel conference circuits, a plurality of stations, and switching means selectively controlled by said stations for connecting said stations to conference channels of a selected one of circuits when said channels are available to said stations; a second remote office; and conference control means at said first office comprising gating means responsive to first and second control signals from said remote office for rendering said channels available and unavailable respectively, and responsive to third signals from said remote office for interconnecting said individual conference circuits, means for sending a first supervisory signal to said remote office for indicating when a said channel is rendered available for station connection, means for sending a second supervisory signal to said remote office for indicating when a said station has connected to an available channel, and means for sending a third supervisory signal to said remote office for indicating when said individual conference circuits are connected together; said remote office comprising remote control means inaccessible to said substations for sending first and second control signals to said conference control means for controlling channel availability and for sending third signals to said conference control means for interconnecting said individual circuits, first indicating means responsive to said first and second supervisory signals from said conference control means for indicating the channel availability and connection state thereof, respectively, and second indicating means responsive to said third supervisory signal from said conference control means for indicating when said individual conference circuits are connected together.

11. In a telephone system including a switching office comprising first and second trunk groups, customer stations, and switching means controlled by any of said stations for connecting said stations to an idle one of said trunks in a selected group, conference means comprising a first multiterminal conference circuit at said switching office having each of its terminals connected to a different one of said trunks in a first one of said trunk groups; a second multiterminal conference circuit at said switching office having each of its terminals connected to a different one of said trunks in a second one of said trunk groups; an attendant switchboard remote from said switching office; a plurality of actuable gating circuits each coupled to a corresponding one of said conference trunks and each being actuated and released in response to individually received first and second control signals from said attendant switchboard for making its corresponding conference trunk idle and busy to said stations in accordance with the particular signal received; means coupled to a predetermined set of said gating circuits and responsive to the simultaneous actuation of said set for connecting their corresponding conference circuit terminals together while maintaining their corresponding trunks busy to said stations; and a plurality of first signaling means at said switching office each coupled with a corresponding one of said gating circuits and effective when its corresponding trunk is idle for sending a first supervisory signal to said switchboard and effective when its corresponding trunk is busy for sending a second supervisory signal to said switchboard; said second remote office comprising means inaccessible to said stations for selectively sending first and second control signals to certain individual ones of said gating circuits for controlling the idle-busy condition of their corresponding trunks in accordance with the signal sent, means responsive to the receipt of first and second supervisory signals from said signaling means for indicating the idle-busy condition of each conference trunk, means inaccessible to said stations for simultaneously actuating said predetermined set of gating means for interconnecting said conference bridges, and means responsive to the interconnection of said conference bridges for indicating when said bridges are interconnected.

12. In a telephone system, a first switching office comprising a plurality of individual controlled-access multichannel conference circuits, a separate group of conference trunks serving each said conference circuit, customer stations, and switching means selectively controllable by any of said stations for connecting a station to an idle conference trunk of a selected trunk group; an attendant switchboard remote from said office; make-busy means individual to each said trunk and selectively actuable in response to control signals from said switchboard for controlling the idle-busy condition of said trunks, said make-busy means also effective for sending to said switchboard supervisory signals indicative of the idle-busy condition of said trunk; and means at said office responsive to the concurrent actuation of a predetermined set of said make-busy means for bridging said plurality of conference circuits together and for sending to said switchboard second supervisory signals indicative of the bridged condition of said conference circuits; said remote switchboard comprising control means inaccessible to said stations for sending control signals to individual ones of said make-busy means for selectively controlling the idle-busy condition of their associated trunks and for sending concurrent control signals to said predetermined set of make-busy means for bridging said conference circuits together; said remote switchboard also comprising means responsive to said first and second supervisory signals from said office for indicating the conference trunk idle-busy condition and conference circuit bridging condition thereat.

13. In a telephone system, a switching office comprising a plurality of individual controlled-access multibranch conference circuits, a separate group of normally busy conference trunks serving each said conference circuit, customer stations, and switching means controlled by any of said stations for connecting a station to an idle conference trunk of a selected trunk group; a remotely located attendant switchboard; a plurality of first signal responsive relay means at said office each associated with a conference trunk and each operative in response to control signals from said switchboard for rendering its corresponding trunks idle for station connection thereto and for returning an interrupted signal to said switchboard when said trunk is idle; a plurality of second relay means at said office each associated with a conference trunk and effective when a station has connected to said trunk for sending a steady signal to said switchboard; said switchboard comprising a plurality of first signal sending means each connected over an individual signaling channel to a corresponding one of said first relay means and each effective for sending control signals over its individual channel to operate said corresponding first relay means, a plurality of signal receiving means each connected over an individual signaling channel to a corresponding one of said first and second relay means and each operative responsive to said interrupted and said steady signals for indicating the idle and connection state of said corresponding conference trunk in accordance with the signal received, and second signal sending means for sending control signals over a predetermined pair of said signaling channels for concurrently operating said corresponding pair of first relay means associated therewith; bridging means at said office responsive to the concurrent operation of said pair of first relay means for maintaining their corresponding trunks busy, for bridging said plurality of conference circuits together, and for sending said steady signals over said pair of channels to said switchboard for concurrently operating said associated pair of signal receiving means; and bridge indicating means at said switchboard responsive to the concurrent operation of said pair of signal receiving means for indicating when said plurality of conference circuits are bridged together.

14. The invention defined in claim 13 wherein each said conference circuit branch comprises transmission conductors connected to a said conference trunk, wherein said bridging means comprises means for disconnecting said transmission conductors from each of said predetermined pair of trunks and for connecting said conductors together, and wherein said bridging means also comprises means for preventing said pair of first relay means from sending interrupted signals to said attendant switchboard.

15. The invention defined in claim 14 wherein said bridging means further comprises a first bridging relay responsive to the concurrent operation of said predetermined pair of first bridging relay means for connecting said conductors together and first disabling means for disabling said first bridging relay when only one of said predetermined pair of first relay means is operated; wherein each said switchboard signal receiving means comprises a supervisory relay and a supervisory lamp; and wherein said switchboard bridge indicating means comprises a bridging lamp, a second bridging relay responsive to the concurrent operation of said predetermined pair of supervisory relays for lighting said bridging lamp, and second disabling means for disabling said second bridging relay when only one of said predetermined pair of supervisory relays is operated.

16. The invention defined in claim 15 wherein said first disabling means includes first timing means responsive to the operation of one of said pair of first relay means for timing a first prescribed interval and effective at the end of said first interval for disabling said first bridging relay; and wherein said second disabling means includes second timing means responsive to the operation of one of said pair of supervisory relays for timing a second prescribed interval and effective at the end of said second interval for disabling said second bridging relay.

No references cited.